(12) United States Patent
Horsey et al.

(10) Patent No.: US 12,248,426 B1
(45) Date of Patent: Mar. 11, 2025

(54) RADIO ETHERNET CONNECTOR

(71) Applicants: Joseph T. Horsey, Alexandria, VA (US); Colin L. West, King George, VA (US); Stephen B. Heintz, Bowie, MD (US)

(72) Inventors: Joseph T. Horsey, Alexandria, VA (US); Colin L. West, King George, VA (US); Stephen B. Heintz, Bowie, MD (US)

(73) Assignee: United States of America, as represented by the Secretary of the Navy, Arlington, VA (US)

( * ) Notice: Subject to any disclaimer, the term of this patent is extended or adjusted under 35 U.S.C. 154(b) by 0 days.

(21) Appl. No.: 18/237,996

(22) Filed: Aug. 25, 2023

(51) Int. Cl.
*G06F 13/42* (2006.01)
*H01R 12/72* (2011.01)
*H01R 24/64* (2011.01)

(52) U.S. Cl.
CPC .. *G06F 13/4282* (2013.01); *G06F 2213/0042* (2013.01); *H01R 12/722* (2013.01); *H01R 24/64* (2013.01)

(58) Field of Classification Search
CPC .................................................. G06N 20/00
See application file for complete search history.

*Primary Examiner* — Henry Tsai
*Assistant Examiner* — Juanito C Borromeo
(74) *Attorney, Agent, or Firm* — Gerhard W. Thielman

(57) ABSTRACT

An attachment device is provided for Ethernet communication to a radio. The device includes a transmit/receive circuit, an interface for universal serial bus (USB)-to-Ethernet, an oscillator, a supervisor circuit, a programmable read-only-memory (PROM), a current regulator, a printed circuit board and a housing. The transmit/receive circuit receives a communication signal via an RJ45 receptor from Ethernet. The USB-to-Ethernet interface connects to the RJ45 receptor to forward the communication signal to the USB. The host connector receives the communication signal from the USB for forwarding to the radio. The oscillator provides a periodic clock signal. The three-pin microprocessor supervisor circuit sequences the communication signal via the clock signal and sequence protocol. The PROM buffers the communication signal and the sequence protocol. The current regulator restricts voltage range of the supervisor circuit. The interface, oscillator, supervisor circuit, PROM and current regulator mount to the PCB. The housing contains the PCB.

8 Claims, 28 Drawing Sheets

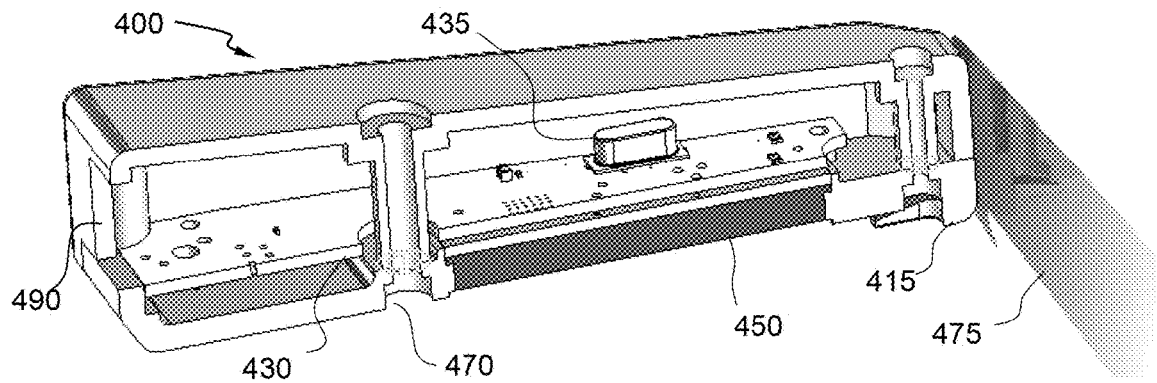

FIG. 4C

PCB 550 connectors

| J1 725 | 163_RED-BLK_host_connector | Mill-Max | 0531-0-15-15-31-27-10-0 |
|---|---|---|---|
| J2 930 | FFC3B11-04-T   580 | GCT | FFC3B11-04-T |
| J3 935 | FFC3B11-04-T   580 | GCT | FFC3B11-04-T | capacitors

| C2 962 | 4700pF | Taiyo-Yuden | UMK063BJ472MP-F |
|---|---|---|---|
| C3 993 | 4.7uF | Taiyo-Yuden | UMK212BBJ475MG-T |
| C4 994 | 4.7uF | Taiyo-Yuden | UMK212BBJ475MG-T |
| C5 995 | 0.1uF | Taiyo-Yuden | UMK105BJ104KV-F |
| C6 996 | 0.1uF | Taiyo-Yuden | UMK105BJ104KV-F |
| C7 997 | 0.1uF | Taiyo-Yuden | UMK105BJ104KV-F |
| C8 998 | 0.1uF | Taiyo-Yuden | UMK105BJ104KV-F |
| C9 999 | 0.1uF | Taiyo-Yuden | UMK105BJ104KV-F |
| C10 990 | 0.1uF | Taiyo-Yuden | UMK105BJ104KV-F | resistor

| R2 742 | 10M | Vishay-Beyschlag | MCU08050C1005FP500 |
|---|---|---|---| ferrite beads

| FB1 721 | 0.5amp 120 Ohm 100MHZ | Murata-Electronics | BLM18EG121SH1D |
|---|---|---|---|
| FB2 722 | 0.5amp 120 Ohm 100MHZ | Murata-Electronics | BLM18EG121SH1D | semiconductors

| U1 921 | MCP1825ST_3.3V | microchipdirect | AZ1117IH-3.3TRG1 |
|---|---|---|---|
| U2 922 | MCP1825ST_3.3V | microchipdirect | AZ1117IH-3.3TRG1 |

FIG. 9K

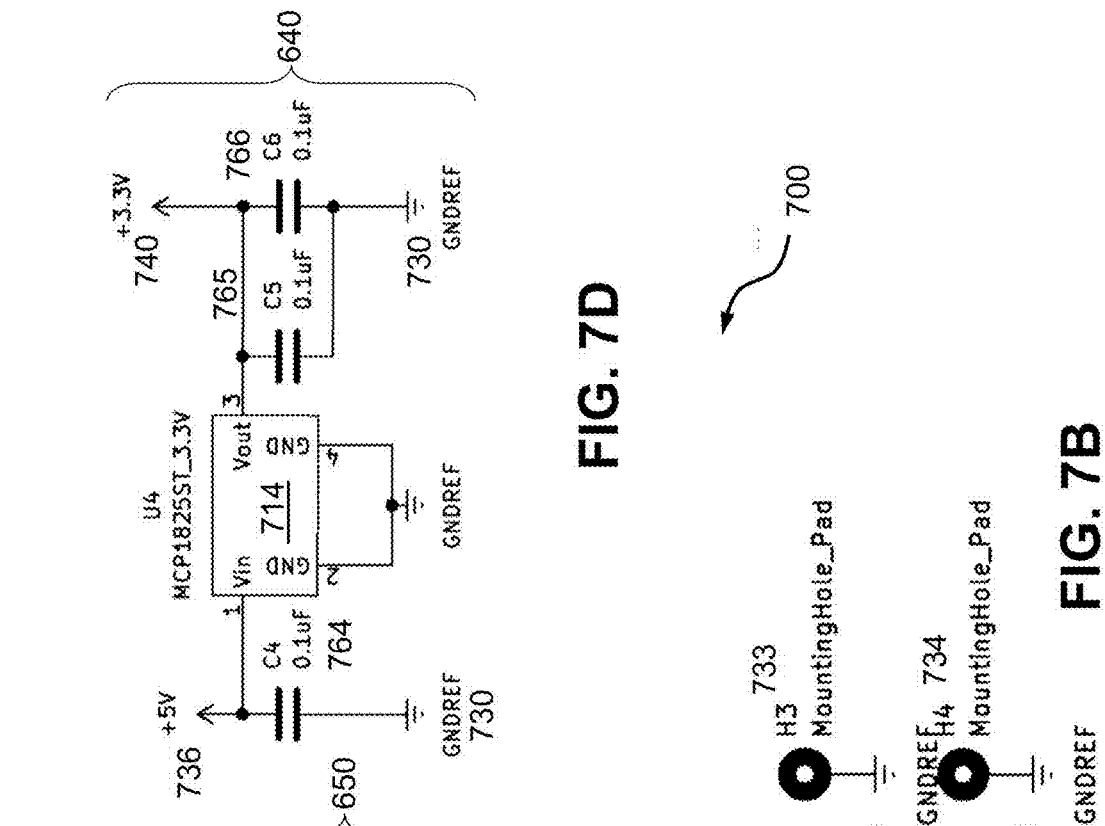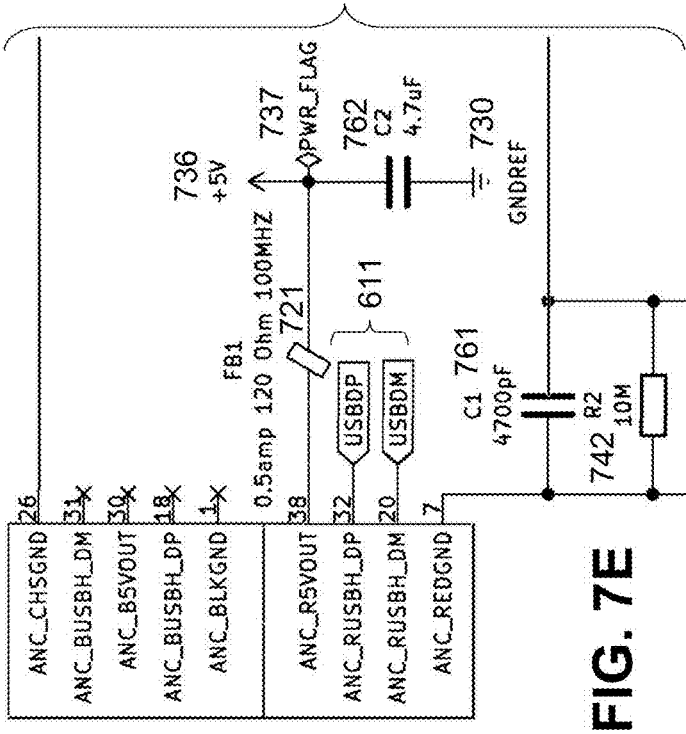

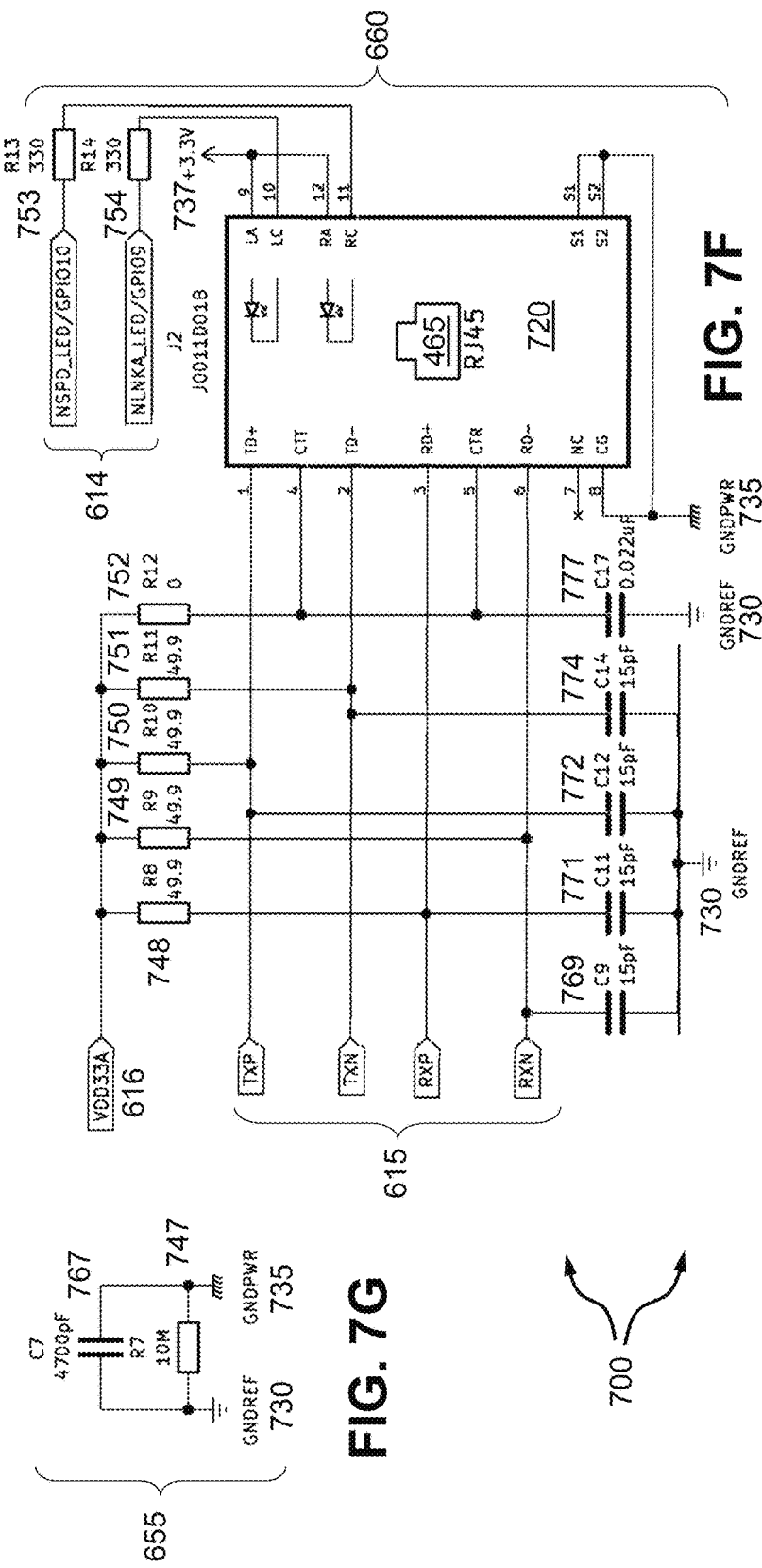

| Label | Component | cross-ref | Label | Component | cross-ref | Label | Component | cross-ref |
|---|---|---|---|---|---|---|---|---|
| 435 | Y1 crystal 25MHz | FIG 7A | 724 | FB4 .5A 12Ω 100MHz | 685 | 765 | C5 | 0.1µF 640 |
| 465 | RJ45 recepticle | FIG 7F | 725 | J1 163_RED-BLK | 650 | 766 | C6 | 0.1µF 640 |
| 600 | schematic view | | 730 | ground reference | | 767 | C7 | 4.7nF 655 |
| 610 | main w/ U1 & U2 | FIG 7A | 731 | H1 mount | 620 FIG 7B | 768 | C8 | 33pF 610 |
| 611 | USB ports | | 732 | H2 mount | 620 FIG 7B | 769 | C9 | 15pF 660 |
| 612 | MD/GPI ports | | 733 | H3 mount | 620 FIG 7B | 770 | C10 | 33pF 610 |
| 613 | EE ports | | 734 | H4 mount | 620 FIG 7B | 771 | C11 | 15pF 660 |
| 614 | LED ports | | 735 | ground power | | 772 | C12 | 15pF 660 |
| 615 | TX/RX ports | | 736 | Vin +5V | | 773 | C13 | 0.1µF 690 |
| 616 | Vdd ports | | 737 | Power Flag | 650 | 774 | C14 | 15pF 660 |
| 620 | hole pads | FIG 7B | 740 | Vcc +3.3V | | 775 | C15 | 1µF 685 |
| 630 | EEPROM w/ U3 | FIG 7C | 741 | R1 10kΩ | 630 | 776 | C16 | 0.1µF 690 |
| 640 | voltage reglr | FIG 7D | 742 | R2 10MΩ | 650 | 777 | C17 | 22mF 660 |
| 650 | host connector | FIG 7E | 743 | R3 10kΩ | 610 | 778 | C18 | 0.1µF 685 |
| 655 | ground connect | FIG 7G | 744 | R4 12kΩ | 610 | 779 | C19 | 0.1µF 690 |
| 660 | transmit/receive | FIG 7F | 745 | R5 12kΩ | 610 | 780 | C20 | 0.1µF 680 |
| 670 | drain volt FB3 | FIG 7H | 746 | R6 0 | 610 | 781 | C21 | 4.7µF 685 |
| 680 | drain volt FB2 | FIG 7H | 747 | R7 10MΩ | 655 | 782 | C22 | 4.7µF 690 |
| 685 | drain volt FB4 | FIG 7H | 748 | R8 49.9Ω | 660 | 783 | C23 | 0.1µF 680 |
| 690 | capacitor bank | FIG 7H | 749 | R9 49.9Ω | 660 | 784 | C24 | 1.5µF 680 |
| 700 | schematic sections | | 750 | R10 49.9Ω | 660 | 785 | C25 | 4.7µF 685 |
| 710 | oscillator | 610 | 751 | R11 49.9Ω | 660 | 786 | C26 | 4.7µF 680 |
| 711 | U1 LAN9500AI-A8ZJ-TR | | 752 | R12 0 | 660 | 787 | C27 | 4.7µF 690 |
| 712 | U2 MIC803-2904VM3TR | 610 | 753 | R13 330Ω | 660 | 788 | C28 | 1.5µF 680 |
| 713 | U3 93AA56AT-IOT | 630 | 754 | R14 330Ω | 660 | 789 | C29 | 4.7µF 685 |
| 714 | U4 MCP1825ST_3.3V | 640 | 760 | Vcc -3.3V | 610 | 790 | C30 | 1.5µF 690 |
| 720 | J2 J0011D018 | 660 | 761 | C1 4.7nF | 650 | | | |
| 721 | FB1 .5A 12Ω 100MHz | 650 | 762 | C2 4.7µF | 650 | | | |
| 722 | FB2 .5A 12Ω 100MHz | 680 | 763 | C3 0.1µF | 630 | | | |
| 723 | FB3 .5A 12Ω 100MHz | 670 | 764 | C4 0.1µF | 640 | | | |

FIG. 7I

PCB 530

700 connectors

| | | | | |
|---|---|---|---|---|
| J1 | 725 | 163_RED-BLK_host_connector | mill-max-manufacturing-corp | 0531-0-15-15-31-27-10-0 |
| J2 | 720 | Ethernet RJ 45 output  460 | pulse-electronics-network | J0011D01BNL | capacitors

| | | | | |
|---|---|---|---|---|
| C9 | 769 | 15pF | Taiyo-Yuden | UMK063CG150JTHF |
| C10 | 770 | 33pF | Taiyo-Yuden | UMK063CH330JT-F |
| C11 | 771 | 15pF | Taiyo-Yuden | UMK063CG150JTHF |
| C12 | 772 | 15pF | Taiyo-Yuden | UMK063CG150JTHF |
| C13 | 773 | 0.1uF | Taiyo-Yuden | UMK105BJ104KV-F |
| C14 | 774 | 15pF | Taiyo-Yuden | UMK063CG150JTHF |
| C15 | 775 | 1uF | Taiyo-Yuden | UMK212AB710SKD-T |
| C16 | 776 | 0.1uF | Taiyo-Yuden | UMK105BJ104KV-F |
| C17 | 777 | 0.022uF | Taiyo-Yuden | UMK105B7223KVHF |
| C18 | 778 | 0.1uF | Taiyo-Yuden | UMK105BJ104KV-F |
| C19 | 779 | 0.1uF | Taiyo-Yuden | UMK105BJ104KV-F |
| C20 | 780 | 0.1uF | Taiyo-Yuden | UMK105BJ104KV-F |
| C21 | 781 | 4700pF | Taiyo-Yuden | UMK063BJ472MP-F |
| C22 | 782 | 4700pF | Taiyo-Yuden | UMK063BJ472MP-F |
| C23 | 783 | 0.1uF | Taiyo-Yuden | UMK105BJ104KV-F |
| C24 | 784 | 1500pF | Murata-Electronics | GRM033R71H152MA12D |
| C25 | 785 | 4700pF | Taiyo-Yuden | UMK063BJ472MP-F |
| C26 | 786 | 4700pF | Taiyo-Yuden | UMK063BJ472MP-F |
| C27 | 787 | 4700pF | Taiyo-Yuden | UMK063BJ472MP-F |
| C28 | 788 | 1500pF | Murata-Electronics | GRM033R71H152MA12D |
| C29 | 789 | 4700pF | Taiyo-Yuden | UMK063BJ472MP-F |
| C30 | 790 | 1500pF | Murata-Electronics | GRM033R71H152MA12D | resistors

| | | | | |
|---|---|---|---|---|
| R1 | 741 | 10K | Panasonic | ERA-1AEB103C |
| R2 | 742 | 10M | Vishay-Beyschlag | MCU08050C1005FP500 |
| R3 | 743 | 10K | Panasonic | ERA-1AEB103C |
| R4 | 744 | 12.0K | Vishay-Dale | TNPW020112K08EED |
| R5 | 745 | 12.0K | Vishay-Dale | TNPW020112K08EED |
| R6 | 746 | 0 | Vishay-Sfernice | PZHT0402-0R00GPT |
| R7 | 747 | 10M | Vishay-Beyschlag | MCU08050C1005FP500 |
| R8 | 748 | 49.9 | Panasonic | ERA-6AED49R9V |
| R9 | 749 | 49.9 | Panasonic | ERA-6AED49R9V |
| R10 | 750 | 49.9 | Panasonic | ERA-6AED49R9V |
| R11 | 751 | 49.9 | Panasonic | ERA-6AED49R9V |
| R12 | 752 | 0 | Vishay-Sfernice | PZHT0402-0R00GPT |
| R13 | 753 | 330 | Panasonic | ERA-2AED331X |
| R14 | 754 | 330 | Panasonic | ERA-2AED331X | ferrite beads

| | | | | |
|---|---|---|---|---|
| FB1 | 721 | 0.5amp 120 Ohm 100MHZ | Murata-Electronics | BLM18EG121SH1D |
| FB2 | 722 | 0.5amp 120 Ohm 100MHZ | Murata-Electronics | BLM18EG121SH1D |
| FB3 | 723 | 0.5amp 120 Ohm 100MHZ | Murata-Electronics | BLM18EG121SH1D |
| FB4 | 724 | 0.5amp 120 Ohm 100MHZ | Murata-Electronics | BLM18EG121SH1D | semiconductors

| | | | | |
|---|---|---|---|---|
| U1 | 711 | USB Interface IC USB 2.0 Ethernet MAC PHY Auto-MDIX  660 | Microchip | LAN9500AI-ABZJ-TR |
| U2 | 712 | 3-Pin Microprocessor Supervisor Circuit w/ Open-Drain Reset Output | Microchip | MIC803-29D4VM3TR |
| U3 | 713 | EEPROM 256x8 - 1.8V-5.5V | Microchip | 93AA56AT-I/OT |
| U4 | 714 | LDO Voltage Regulators 500 mA CMOS LDO Vout 3.3V ETR | Microchip | MCP1825ST-3302E/DB |

FIG. 7J

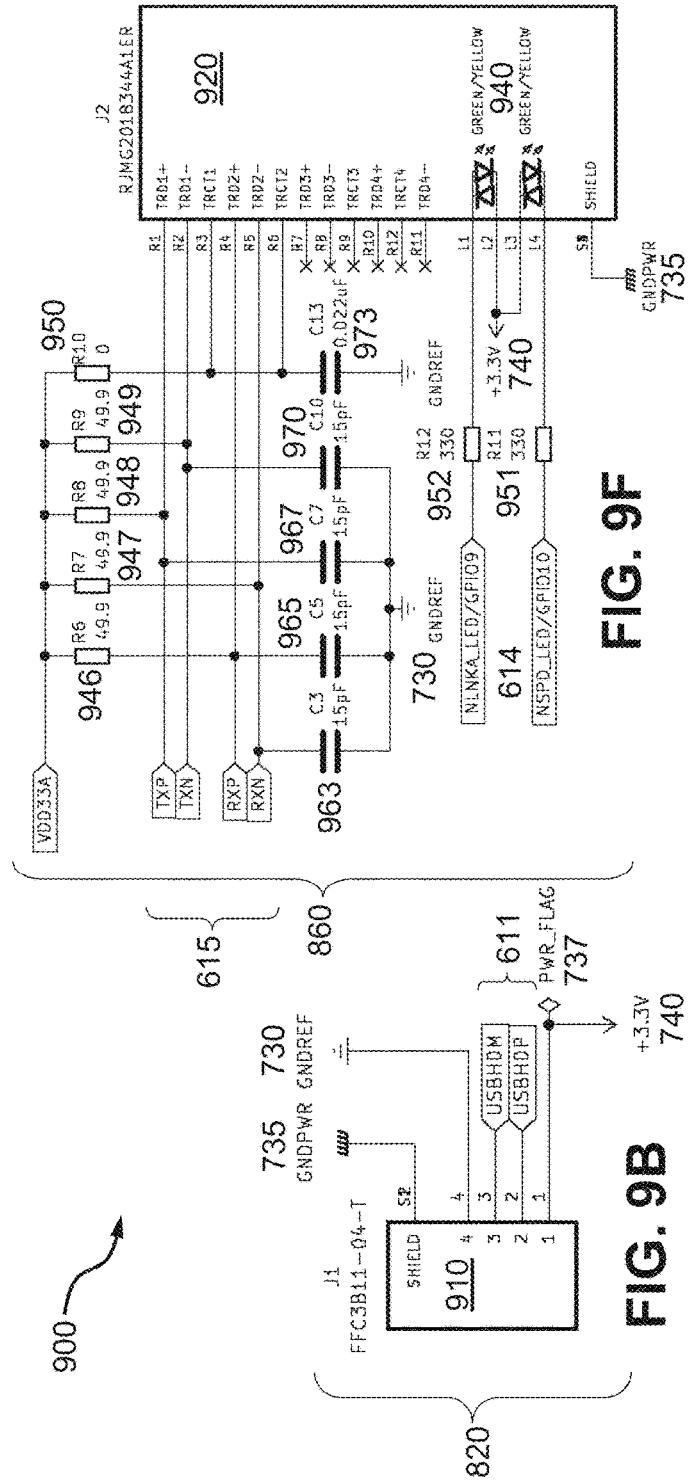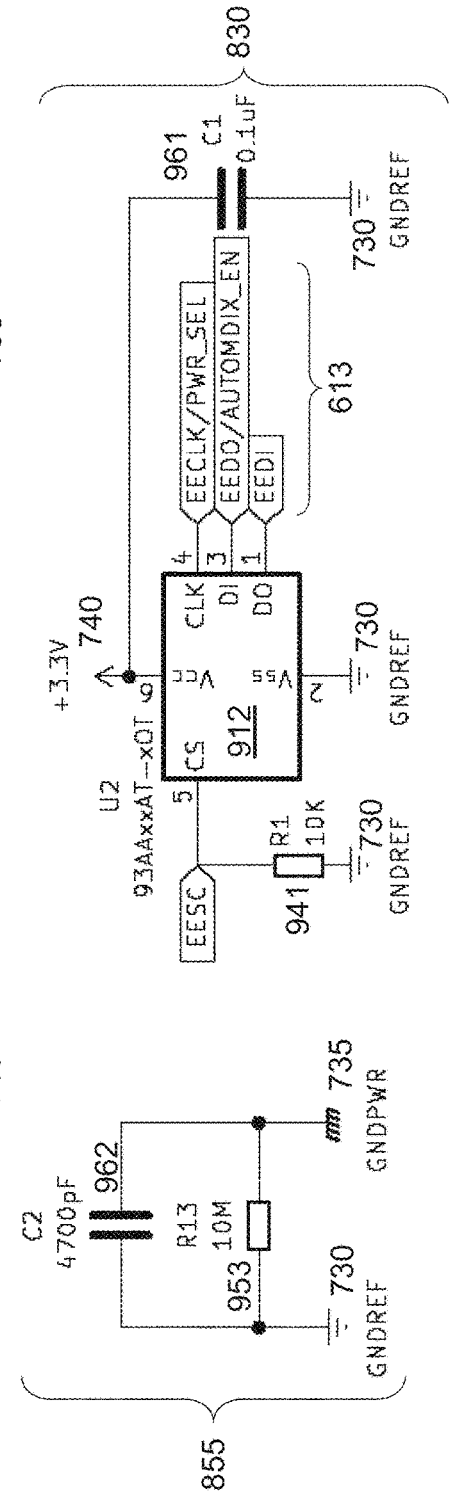

| Label | Component | cross-ref | Label | Component | cross-ref | Label | Component | cross-ref |
|---|---|---|---|---|---|---|---|---|
| 435 | Y1 25MHz crystal FIG 9A | | 910 | J1 FFC3B11 | 820 | 967 | C7 15pF | 860 |
| 611 | USB ports | | 911 | U1 MIC803 | 810 | 968 | C8 0.1µF | 890 |
| 612 | MD/GPI ports | | 912 | U2 93AA56AT | 830 | 969 | C9 1µF | 885 |
| 613 | EE ports | | 913 | U3 LAN9500AI | 810 | 970 | C10 15pF | 860 |
| 614 | LED ports | | 920 | J2 RJMG2018 | 860 | 971 | C11 0.1µF | 885 |
| 615 | TX/RX ports | | 921 | U1 MCP1825 | 840 | 972 | C12 0.1µF | 890 |
| 616 | Vdd ports | | 922 | U2 MCP1825 | 845 | 973 | C13 15pF | 860 |
| 700 | schematic sections | | 930 | J2 FFC3B11 | 840 | 974 | C14 0.1µF | 880 |
| 721 | FB1 .5A 120Ω 850 | 880 | 935 | J3 FFC3B11 | 845 | 975 | C15 4.7µF | 870 |
| 722 | FB2 .5A 120Ω 850 | 885 | 940 | LED ylw/grn | 860 | 976 | C16 4.7µF | 890 |
| 723 | FB3 .5A 120Ω 100MHz | 870 | 941 | R1 10kΩ | 830 | 977 | C17 0.1µF | 880 |
| 725 | J1 163_RED-BLK | 850 | 942 | R2 12kΩ | 810 | 978 | C18 1.5µF | 885 |
| 730 | ground reference | | 943 | R3 12kΩ | 810 | 979 | C19 4.7µF | 890 |
| 735 | ground power | | 944 | R4 0 | 810 | 980 | C20 4.7µF | 880 |
| 740 | Vcc +3.3V | | 945 | R5 10Ω | 860 | 981 | C21 1.5µF | 890 |
| 742 | R2 10MΩ | 850 | 946 | R6 49.9Ω | 860 | 982 | C22 4.7µF | 885 |
| 800 | schematic view | | 947 | R7 49.9Ω | 860 | 983 | C23 1.5µF | 880 |
| 810 | U3 LAN9500 crct FIG 9A | | 948 | R8 49.9Ω | 860 | 984 | C24 4.7µF | 870 |
| 820 | J1 FFC3B11 crct FIG 9B | | 949 | R9 49.9Ω | 860 | 985 | C25 1.5µF | 890 |
| 830 | U3 93AA56AT FIG 9C | | 950 | R10 0 | 860 | 990 | C10 0.1µF | 845 |
| 840 | U1 MCP1825ST FIG 9D | | 951 | R11 330Ω | 860 | 993 | C3 4.7µF | 850 |
| 845 | U2 MCP1825ST FIG 9D | | 952 | R12 330Ω | 860 | 994 | C4 4.7µF | 850 |
| 850 | J1 163 circuit FIG 9E | | 953 | R13 10MΩ | 855 | 995 | C5 1.5µF | 845 |
| 855 | VR1 LP38693MP-3 FIG 9G | | 960 | oscillator | 810 | 996 | C6 0.1µF | 840 |
| 860 | USB Connector FIG 9F | | 961 | C1 0.1µF | 830 | 997 | C7 0.1µF | 840 |
| 870 | drain volt FB3 FIG 9H | | 962 | C2 4.7µF 850 | 855 | 998 | C8 0.1µF | 845 |
| 880 | drain volt FB1 FIG 9H | | 963 | C3 15pF | 860 | 999 | C9 0.1µF | 840 |
| 885 | drain volt FB2 FIG 9H | | 964 | C4 33pF | 810 | | | |
| 890 | capacitor bank FIG 9H | | 965 | C5 15pF | 860 | | | |
| 900 | schematic sections | | 966 | C6 33pF | 810 | | | |

FIG. 9I

PCB 540 connectors

| | | | | | |
|---|---|---|---|---|---|
| J1 | 910 | FFC3B11-04-T | 580 | GCT | FFC3B11-04-T |
| J2 | 920 | RJMG2018344A1ER | 570 | amphenol-icc | RJMG2018344A1ER | capacitors

| | | | | |
|---|---|---|---|---|
| C1 | 961 | 0.1uF | Taiyo-Yuden | UMK105BJ104KV-F |
| C2 | 962 | 4700pF | Taiyo-Yuden | UMK063BJ472MP-F |
| C3 | 963 | 15pF | Taiyo-Yuden | UMK063CG150JTHF |
| C4 | 964 | 33pF | Taiyo-Yuden | UMK063CH330JT-F |
| C5 | 965 | 15pF | Taiyo-Yuden | UMK063CG150JTHF |
| C6 | 966 | 33pF | Taiyo-Yuden | UMK063CH330JT-F |
| C7 | 967 | 15pF | Taiyo-Yuden | UMK063CG150JTHF |
| C8 | 968 | 0.1uF | Taiyo-Yuden | UMK105BJ104KV-F |
| C9 | 969 | 1uF | Taiyo-Yuden | UMK212AB7105KD-T |
| C10 | 970 | 15pF | Taiyo-Yuden | UMK063CG150JTHF |
| C11 | 971 | 0.1uF | Taiyo-Yuden | UMK105BJ104KV-F |
| C12 | 972 | 0.1uF | Taiyo-Yuden | UMK105BJ104KV-F |
| C13 | 973 | 0.022uF | Taiyo-Yuden | UMK105B7223KVHF |
| C14 | 974 | 0.1uF | Taiyo-Yuden | UMK105BJ104KV-F |
| C15 | 975 | 4700pF | Taiyo-Yuden | UMK063BJ472MP-F |
| C16 | 976 | 0.1uF | Taiyo-Yuden | UMK105BJ104KV-F |
| C17 | 977 | 0.1uF | Taiyo-Yuden | UMK105BJ104KV-F |
| C18 | 978 | 1500pF | Murata-Electronics | GRM033R71H152MA12D |
| C19 | 979 | 4700pF | Taiyo-Yuden | UMK063BJ472MP-F |
| C20 | 980 | 4700pF | Taiyo-Yuden | UMK063BJ472MP-F |
| C21 | 981 | 4700pF | Taiyo-Yuden | UMK063BJ472MP-F |
| C22 | 982 | 4700pF | Taiyo-Yuden | UMK063BJ472MP-F |
| C23 | 983 | 1500pF | Murata-Electronics | GRM033R71H152MA12D |
| C24 | 984 | 4700pF | Taiyo-Yuden | UMK063BJ472MP-F |
| C25 | 985 | 1500pF | Murata-Electronics | GRM033R71H152MA12D | resistors

| | | | | | |
|---|---|---|---|---|---|
| R1 | 941 | 10K | | Panasonic | ERA-1AEB103C |
| R2 | 942 | 12.0K | | Vishay-Dale | TNPW020112K0BEED |
| R3 | 943 | 12.0K | | Vishay-Dale | TNPW020112K0BEED |
| R4 | 944 | | 0 | Vishay-Sfernice | PZHT0402-0R00GPT |
| R5 | 945 | 10K | | Panasonic | ERA-1AEB103C |
| R6 | 946 | | 49.9 | Panasonic | ERA-6AED49R9V |
| R7 | 947 | | 49.9 | Panasonic | ERA-6AED49R9V |
| R8 | 948 | | 49.9 | Panasonic | ERA-6AED49R9V |
| R9 | 949 | | 49.9 | Panasonic | ERA-6AED49R9V |
| R10 | 950 | | 0 | Vishay-Sfernice | PZHT0402-0R00GPT |
| R11 | 951 | | 330 | Panasonic | ERA-2AED331X |
| R12 | 952 | | 330 | Panasonic | ERA-2AED331X |
| R13 | 953 | 10M | | Vishay-Beyschlag | MCU08050C1005FP500 | ferrite beads

| | | | | |
|---|---|---|---|---|
| FB1 | 721 | 0.5amp 120 Ohm 100MHZ | Murata-Electronics | BLM18EG121SH1D |
| FB2 | 722 | 0.5amp 120 Ohm 100MHZ | Murata-Electronics | BLM18EG121SH1D |
| FB3 | 723 | 0.5amp 120 Ohm 100MHZ | Murata-Electronics | BLM18EG121SH1D | semiconductors

| | | | | |
|---|---|---|---|---|
| U1 | 911 | MIC803-29D4VM3TR | microchipdirect | MIC803-29D4VM3TR |
| U2 | 912 | 93AAxxAT-xOT | microchipdirect | 93AA56AT-I/OT |
| U3 | 913 | LAN9500AI-ABZJ-TR | microchipdirect | LAN9500AI-ABZJ-TR |

FIG. 9J

RADIO ETHERNET CONNECTOR

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to Ethernet connection for a handheld radio.

Ethernet developed as a local area network (LAN) communication standard IEEE 803.3 in 1983. Field communication necessitates segregating radio signals into an internal "red" side for sensitive plaintext information and an external "black" side for encrypted or ciphertext information. See MIL-HDBK-232A "Red/Black Engineering-Installation Guidelines" (available at https://www.wbdg.org/FFC/NAVFAC/DMMHNAV/hdbk232a.pdf).

FIG. 1 shows a perspective view 100 of an AN/PRC-163 multichannel handheld radio 110 from L3HARRIS™ in Melbourne, Florida. The radio 110 includes a housing 120 and a front shell 130 featuring a keypad 140 and a liquid crystal diode (LCD) display 150. The radio 110 receives and transmits signals in the radio frequency (RF) electromagnetic spectrum. A connection interface bus 160 attaches to the housing 120. The bus 160 enables communication between a universal serial bus (USB) and an Ethernet transceiver, such as for red/black text communication.

FIG. 2 shows a perspective view 200 of the AN/PRC-163 radio 110 installed within an enclosure 210 and with antennas 220 connected to the radio 110. FIG. 3 shows a perspective view 300 of a conventional cabling configuration from L3Harris with an Ethernet black connector 310 and an Ethernet red connector 320 joined by a coaxial cable 330. The connector 320 of the L3Harris-supplied USB-to-Ethernet configuration mounts to the bus 160 on the side of the ANPRC-163 radio 110.

SUMMARY

Conventional radio connectors yield disadvantages addressed by various exemplary embodiments of the present invention. In particular, various exemplary embodiments provide an attachment device for Ethernet communication to a radio. The device includes a transmit/receive circuit, an interface for universal serial bus (USB)-to-Ethernet, an oscillator, a supervisor circuit, a programmable read-only-memory (PROM), a current regulator, a printed circuit board and a housing.

The transmit/receive circuit receives a communication signal via an RJ45 receptor from Ethernet. The USB-to-Ethernet interface connects to the RJ45 receptor to forward the communication signal to the USB. The host connector receives the communication signal from the USB for forwarding to the radio. The oscillator provides a periodic clock signal. The three-pin microprocessor supervisor circuit sequences the communication signal via the clock signal and sequence protocol. The PROM buffers the communication signal and the sequence protocol. The current regulator restricts voltage range of the supervisor circuit. The interface, oscillator, supervisor circuit, PROM and current regulator mount to the PCB. The housing contains the PCB.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which:

FIG. 4C is a perspective cutaway view of the red Ethernet dongle;

FIGS. 7A, 7B, 7C, 7D, 7E, 7F, 7G and 7H are detail schematic views of the PCB;

FIGS. 7I and 7J are tabular views of schematic PCB components;

FIGS. 9A, 9B, 9C, 9D, 9E, 9F, 9G and 9H are detail schematic views of the PCBs;

FIGS. 9I, 9J and 9K are tabular view of schematic PCB components;

DETAILED DESCRIPTION

Figure 1:
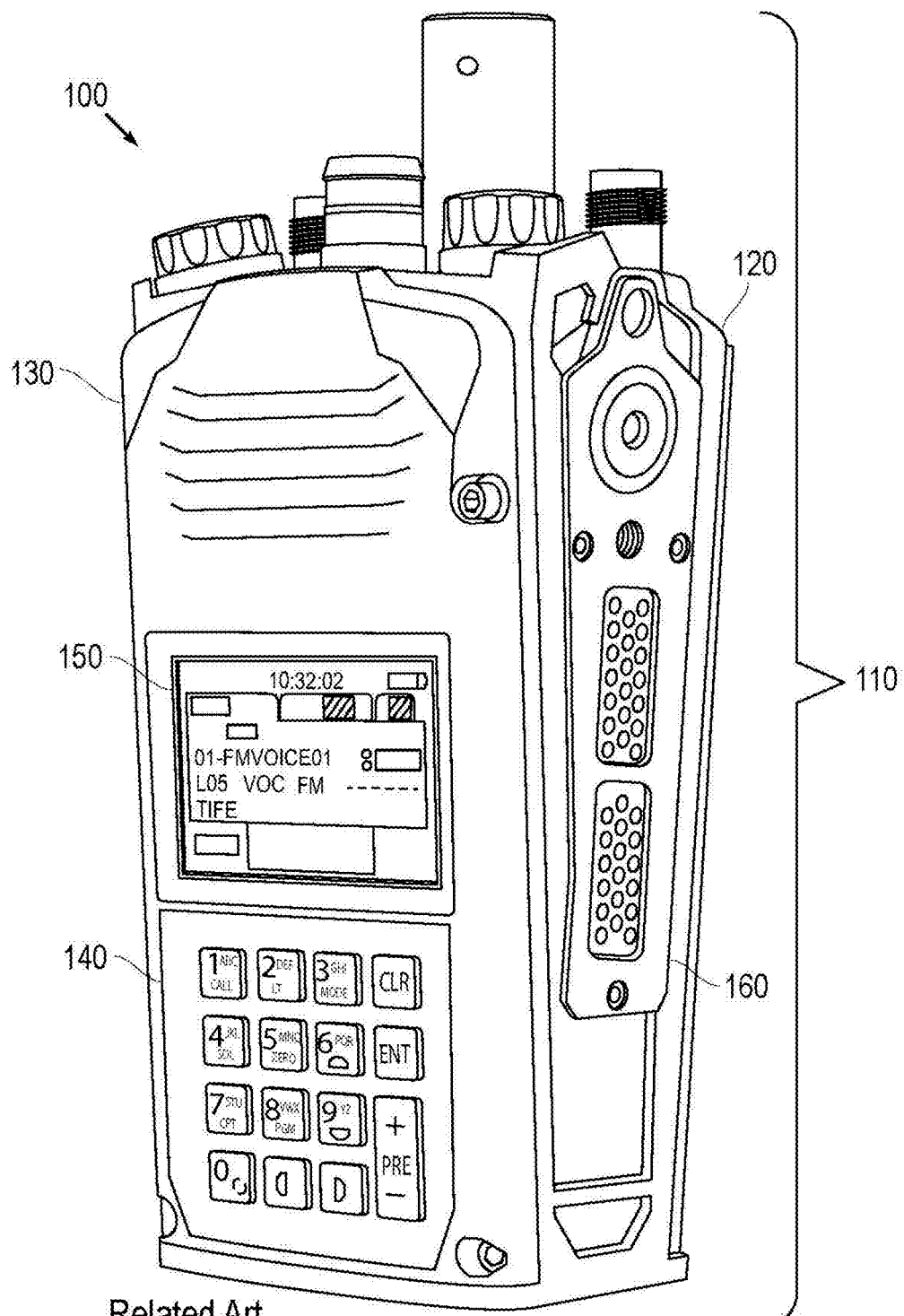
FIG. 1 is a perspective view of a commercial handheld radio.
Figure 2:
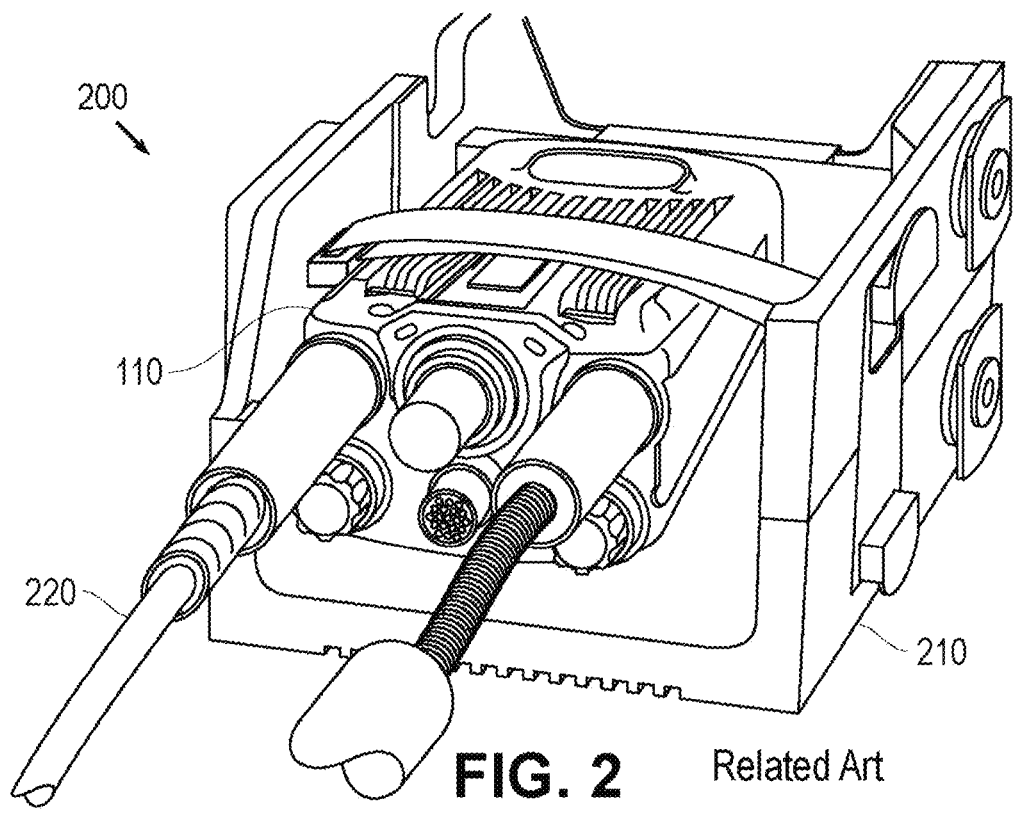
FIG. 2 is a perspective view of the commercial radio in a case.
Figure 3:
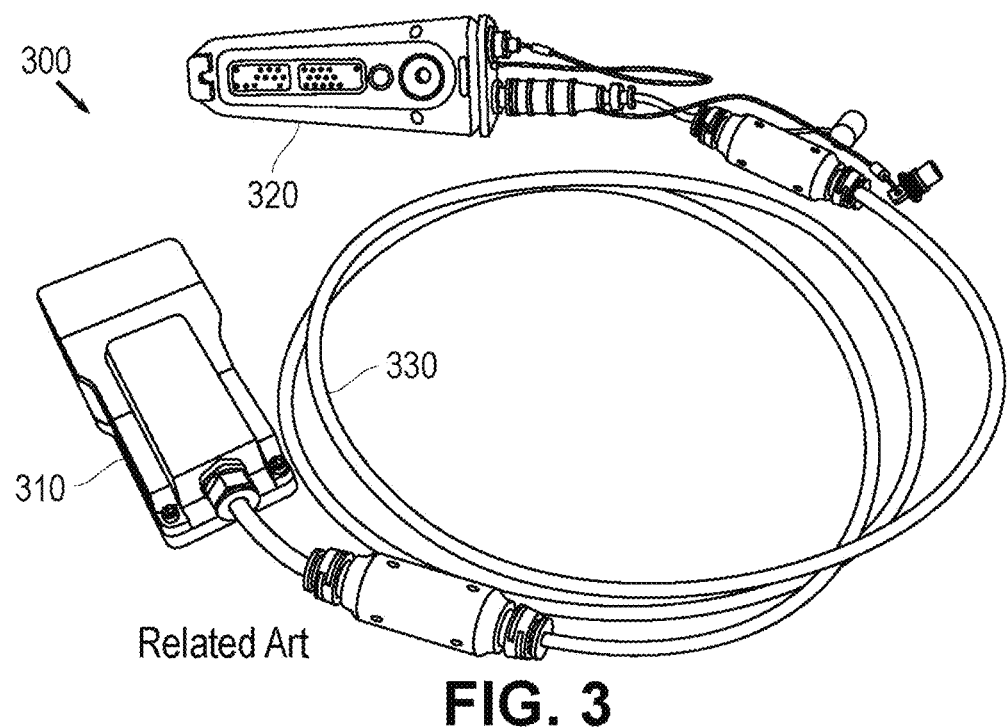
FIG. 3 is a perspective view of a cable connection.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

In accordance with a presently preferred embodiment of the present invention, the components, process steps, and/or data structures may be implemented using various types of operating systems, computing platforms, computer programs, and/or general purpose machines. In addition, artisans of ordinary skill will readily recognize that devices of a less general purpose nature, such as hardwired devices, may also be used without departing from the scope and spirit of the inventive concepts disclosed herewith.

General purpose machines include devices that execute instruction code. A hardwired device may constitute an application specific integrated circuit (ASIC), a field programmable gate array (FPGA), digital signal processor (DSP) or other related component. Exemplary embodiments herein describe primarily electronic hardware.

The disclosure generally employs quantity units with the following abbreviations: length in meters (m) or feet ('), mass in grams (g), time in seconds(s), electric potential in volts (V), resistances in ohms (Ω), capacitance in farads (F), current in amperes (A), energy in joules (J) and frequencies in hertz (Hz. Supplemental measures can be derived from these, such as density in grams-per-cubic-centimeters (g/cm$^3$), moment of inertia in gram-square-centimeters (kg-m$^2$) and the like.

The Marine Corps Warfighting Laboratory (MCWL) tasked Naval Surface Warfare Center-Dahlgren Division (NSWCDD) Code H14 to build the Marine Air-Ground Task Force Integrated Command and Control (MIC2) system. MIC2 uses various waveforms to transmit data over long distances using frequencies in the radio frequency (RF) spectrum. Waveforms TSM-X and ANW2C are to be accessed using the ANPRC-163 handheld radio 110.

An Ethernet/IP connection forms the link between the ANPRC-163 radio 110 and the communications network. The ANPRC-163 radio 110 mounts into an enclosure 210 with multiple different devices to include other radios and network gear including servers, routers, and switches. The enclosure 210 can vary in size, but in practice constrains mounting options for auxiliary equipment to the radio 110 as shown in view 200. This would require the Ethernet output to be mounted within this enclosure 210 as well, so that the conventional commercial design cannot fit therein.

FIGS. 4A, 4B, 4C and 4D shows perspective views 400 of an exemplary red dongle 410 intended to fit within the housing 210. The dongle 410 includes a latch 415 for external connection, a case box 420 and a case lid 425. The latch 415 attaches to a flange 440 disposed over a spacer 450. The lid 430 includes a lateral rectangular cavity 455 to receive the spacer 450. The box 420 includes an RJ45 connector 460 for attaching the cable 330 through a receptor 465 into which a cable plug inserts. A through-hole 470 passes through the box 420 and the lid 425. A set of connector pins 445 extend through the spacer 450 and cavity 455. The box 420 and lid 425 are composed of plastic materials, such as polypropylene, phenolic, polyimide.

Figure 4A:
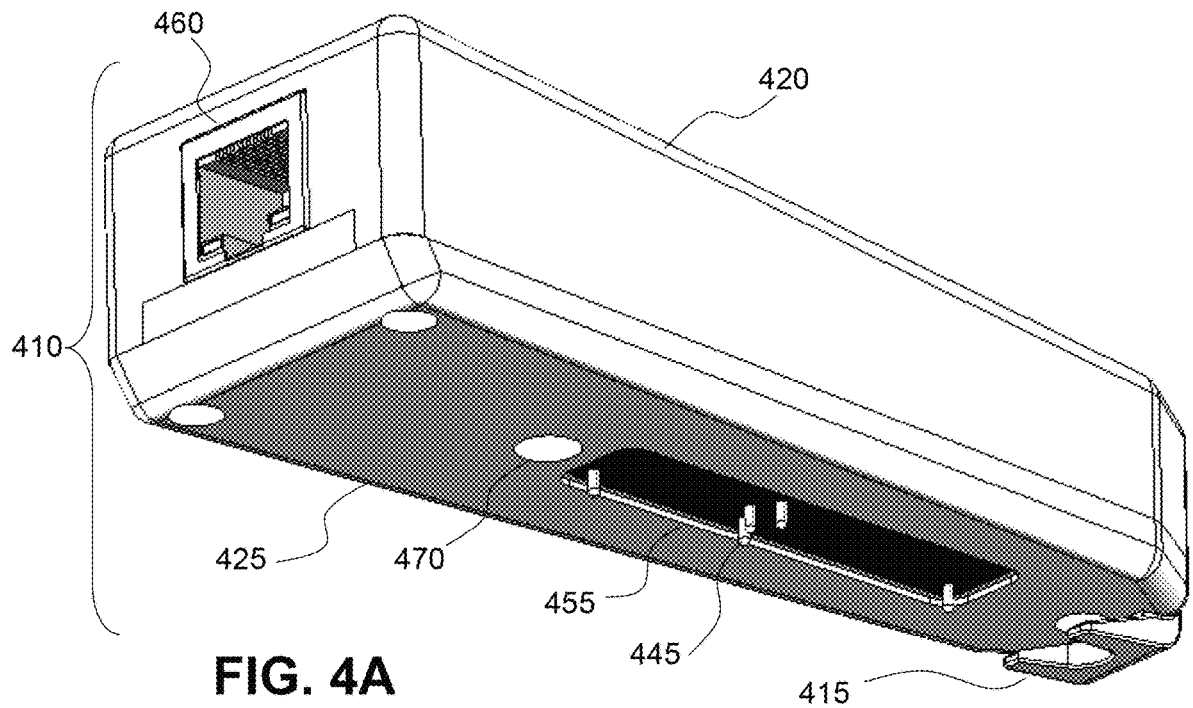
FIG. 4A is a perspective assembly view of a red Ethernet dongle.
Figure 4B:
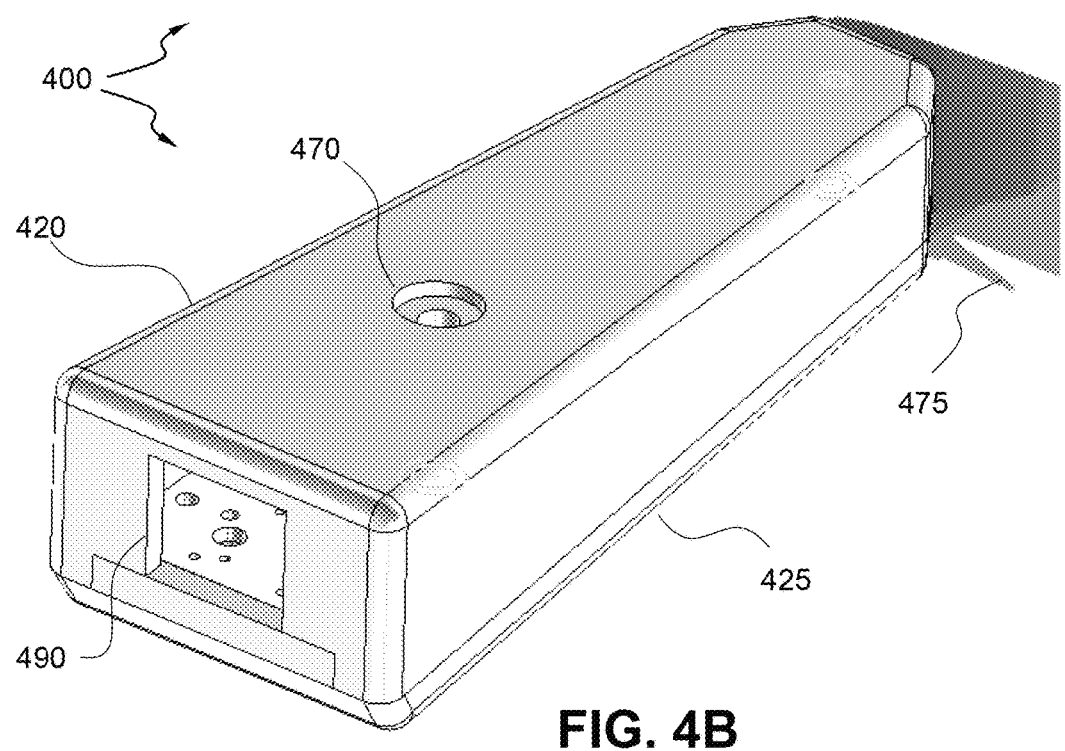
FIG. 4B is a perspective assembly view of the red Ethernet dongle.
Figure 4D:
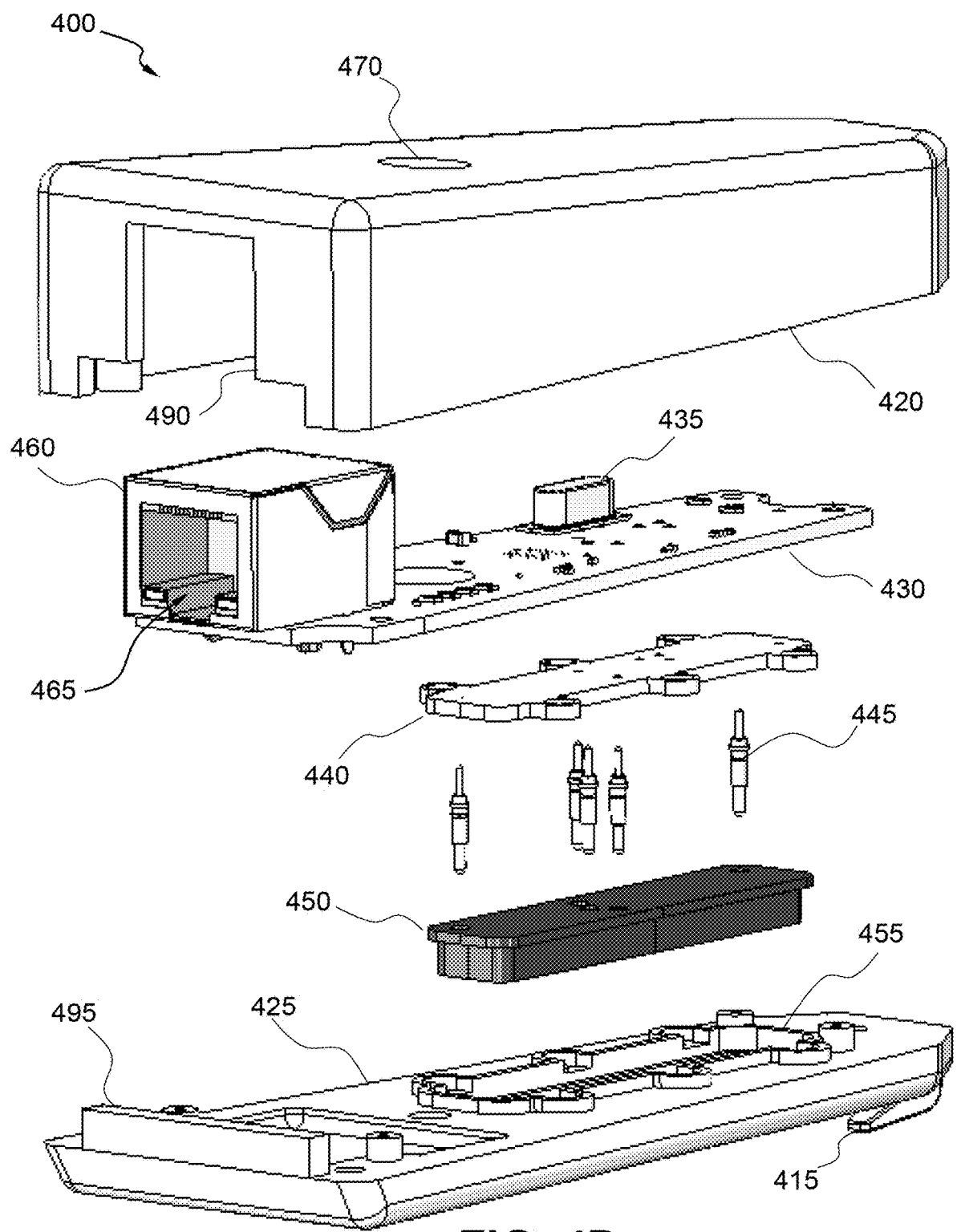
FIG. 4D is a perspective exploded view of components for the red Ethernet dongle.

FIGS. 4A and 4B illustrate the dongle 410 as an assembly, the latter of which shows connection to a chassis 420. FIG. 4C illustrates the dongle 410 in cutaway along the hole 470. The interior features the spacer 450 and the printed circuit board (PCB) 430 that includes an oscillator crystal 435 referenced in the schematics as Y1 mini passive quartz resonator HC49US operating at 25 MHz to produce a periodic clock signal. FIG. 4D illustrates an exploded view of components for the dongle 410. A flange 440 connects the PCB 430 to the cavity 450 of the lid 425. The RJ45 connector 460 opens to its reception interior 465 for accepting an Ethernet plug. The RJ45 connector 460 fits within a axial rectangular cavity 490. The lid 425 includes a tongue 495 that secures the RJ45 connector 460 against the cavity 490.

Figure 5:
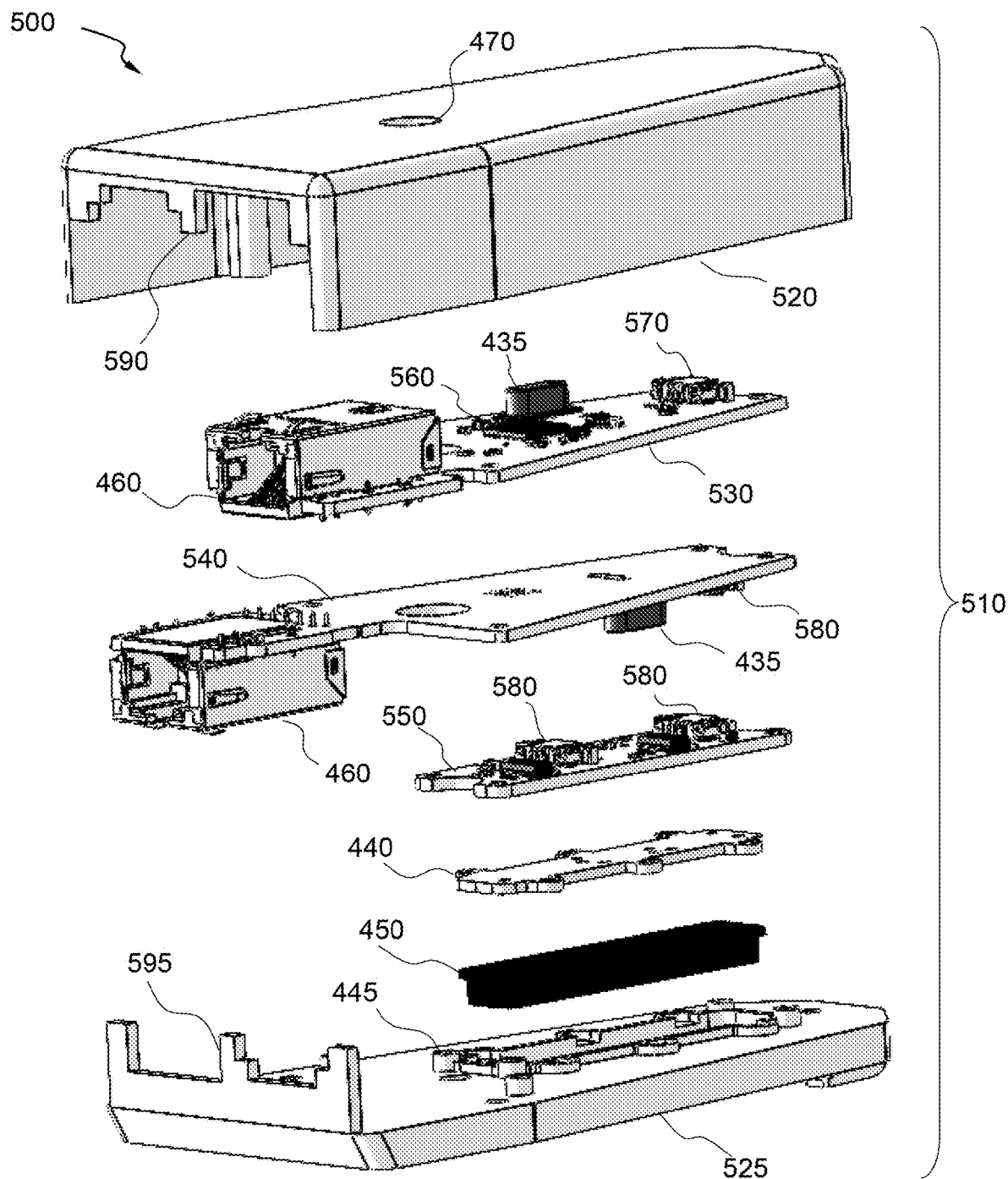
FIG. 5 is a perspective exploded view of a combination red-black Ethernet dongle.

FIG. 5 shows a perspective exploded view 500 of an exemplary combination red-black dongle 510 intended to fit within the housing 210. The dongle 510 includes a pair of RJ45 connectors 460. A case box 520 and a case lid 525 form the dongle's housing. Three printed circuit boards (PCBs) are contained within the housing's volume: red 530, red-black 540, and interface connector 550.

The red and red-black PCBs 530 and 540 include oscillator crystals 435. The red PCB 530 includes a LAN95 chip as integrated circuit 560 and optionally a junction J2 as an RJMG2018344A1ER integrated circuit 570. The red-black PCB 540 includes junction J1 as an FFC3B11 flat flexible cable connector 580. Both PCBs 530 and 540 include an RJ45 connector 460. The connector PCB 550 includes junctions J2 and J3 as a pair of FFC3B11 connectors 580. The flange 440 and spacer 450 are disposed between the PCBs 530, 540 and 550, with the spacer 450 inserting into the cavity 455 of the case lid 525. The box 520 and lid 525 each include cavity 590 and tongue 595 to secure the RJ45 connector 460.

Figure 6:
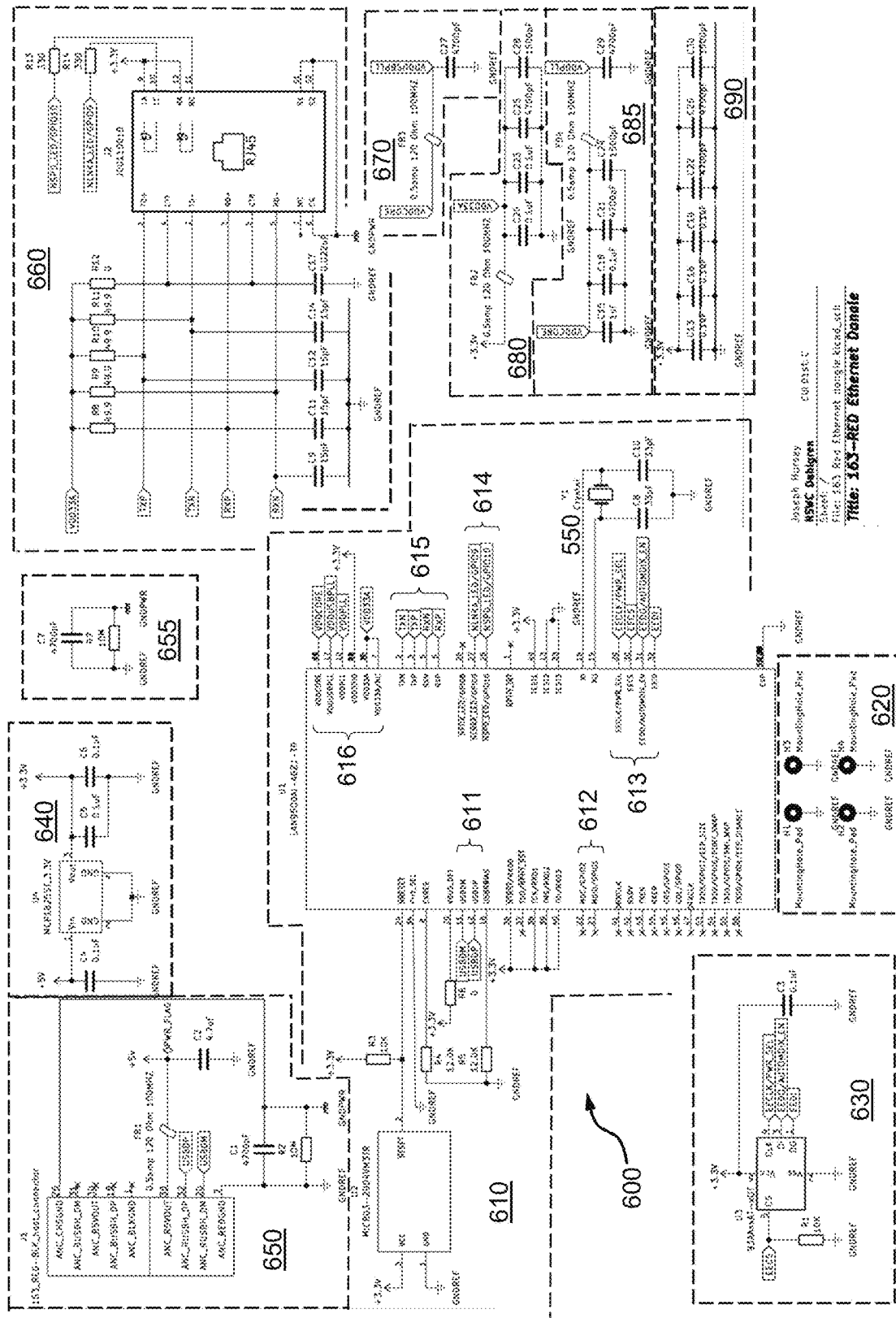
FIG. 6 is a schematic view of a red Ethernet PCB.

FIG. 6 shows a schematic view 600 of a circuit diagram for the Red Ethernet PCBs 430 and 530. The diagram is subdivided into sections. A main section 610 including USB ports 611, MD/GP connectors 612, EE connectors 613, light emitting diodes 614, transmit/receive 615 and drain power voltage ($V_{DD}$) 616. A pad section 620 includes mounting holes. An electronically erasable programmable read only memory (EEPROM) section 630 includes EE connectors 613. Additional portions include a voltage regulator section 640, a host connector section 650, ground connection section 655, a transmit/receive section 660, first, second and third drain voltage sections 670, 680 and 685, and a capacitor bank section 690.

Figure 7A:
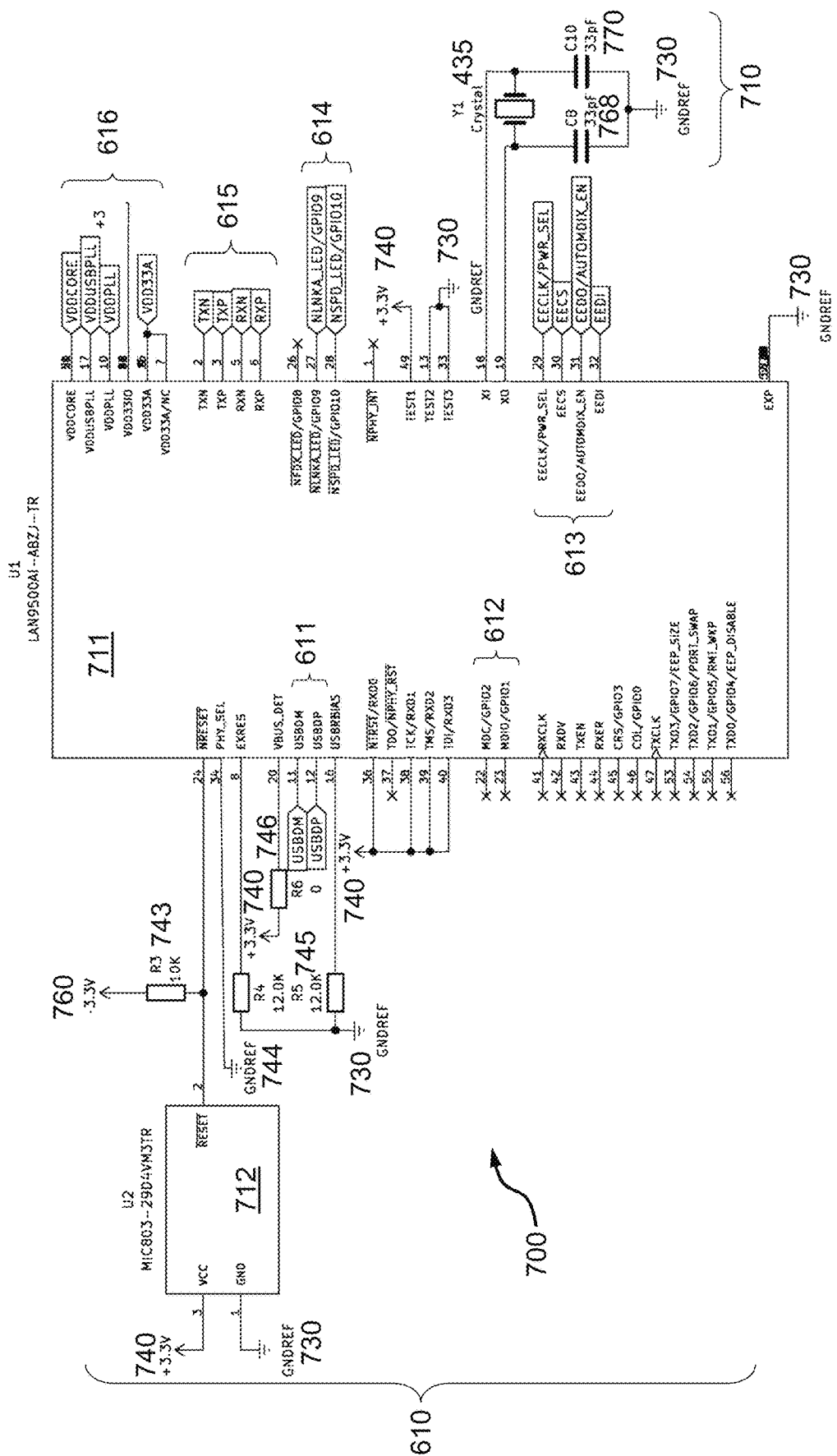

FIGS. 7A, 7B, 7C, 7D, 7E, 7F, 7G, 7H, 7I and 7J show detail schematic or tabular views 700 of components in the Red Ethernet circuit diagram for the PCB 430 in the dongle 410 and the PCB 530 in the dongle 510. FIG. 7A illustrates components in main section 610. FIG. 7B illustrates pins in mounting pad 620. FIG. 7C illustrates components in EEPROM section 630. FIG. 7D illustrates circuit components in voltage regulator 640. FIG. 7E illustrates circuit components in host connector 650.

Figure 7H:
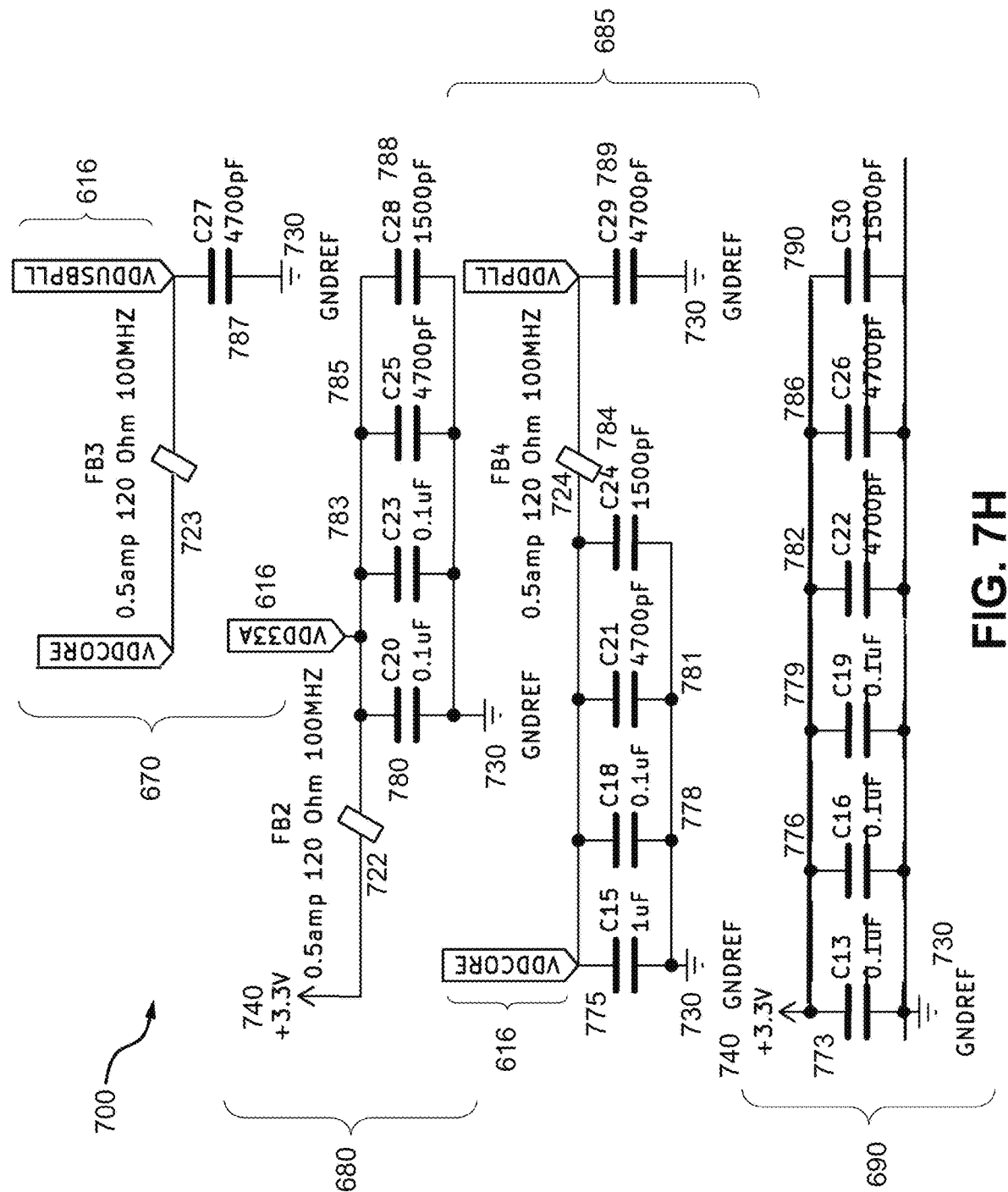

FIG. 7F illustrates connections in transmit/receive section 660. FIG. 7G illustrates components in ground section 655. FIG. 7H illustrates components in drain voltage sections 670, 680 and 685 as well as capacitor bank section 690. FIG. 7I provides a first tabular list of the labeled components with cross-references to select drawings. FIG. 7J provides a second tabular list of the labeled components with manufacturing information.

View 700 includes the following components distributed within the detail schematics listed in FIGS. 7I and 7J. These include an oscillator circuit 710 with the Y1 crystal 435, semiconductors LAN9500AI-A8ZJ-TR Ethernet controller 711 as U1 (featured as 560) and MIC803-2904VM3TR three-pin microprocessor supervisor circuit 712 as U2, both in main section 610, EEPROM 93AA56ATI/OT 713 as U3 in EE memory section 630, and 500 mA current regulator MCP18255T 714 (from Pulse Electronics) as U4 in voltage regulator 640. The three-pin microprocessor supervisor circuit 712 sequences the communication signal via the clock signal and sequence protocol.

The transmit/receive section 660 includes RJ45 port J0011D018 720 as J2. Four ferrous bead (FB) components at current 0.5 A, resistance 120Ω and frequency 100 MHz are distributed among host connector 650 and drain voltage sections 670, 680 and 685. These include FB1 721, FB2 722, FB3 723 and FB4 724. The host connector 650 includes custom 163_RED-BLK host connector junction 725 as J1. This host includes ANC radio connectors to FB1 721 for power, USB ports 611 and red ground.

Additional components include ground reference 730, mounts H1 731, H2 732, H3 733, H4 734, ground power 735, input voltage 736 as Vin at +5V, power flag 737 and chip voltage 740 as $V_{cc}$ at +3.3V. Resistors include R1 741, R2 742, R3 743, R4 744, R5 745, R6 746, R7 747, R8 748, R9 749, R10 750, R11 751, R12 752, R13 753 and R14 754, most of which apply to the transmit/receive section 660. These resistors range from 0Ω to 10MΩ, as shown in FIG. 7I table.

Input power also includes reverse chip voltage 760 as $V_{cc}$ at −3.3V. Capacitors include C1 761, C2 762, C3 763, C4 764, C5 765, C6 766, C7 767, C8 768, C9 769, C10 770, C11 771, C12 772, C12 772, C13 773, C14 774, C15 775, C16 776, C17 777, C18 778, C19 779, C20 780, C21 781, C22 782, C23 783, C24 784, C25 785, C26 786, C27 787, C28 788, C29 789 and C30 790, most of which apply to the transmit/receive section 660, drain voltage sections 670 and 680, and the capacitor bank 690. These capacitors range from 15 pF to 22 mF, as shown in the FIG. 7I table. The main, memory, voltage regulator, host, ground, transmit/receive, drain voltage and capacitor bank sections 610, 630, 640, 650, 655, 660, 670, 680, 685 and 690 operate together in the red PCB 530.

Figure 8A:
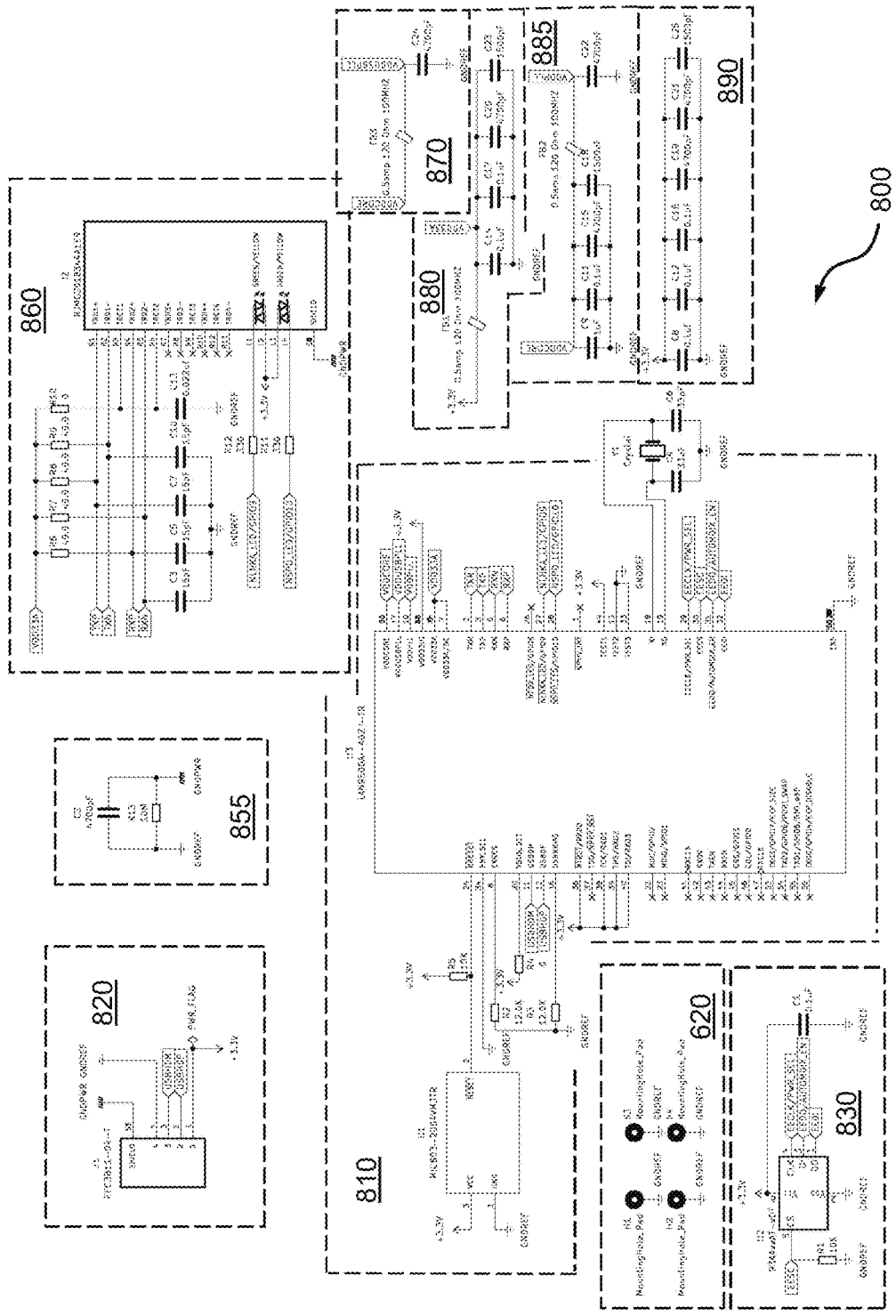
FIGS. 8A and 8B is are schematic views of a Red-Black Ethernet and Connector PCBs.
Figure 8B:
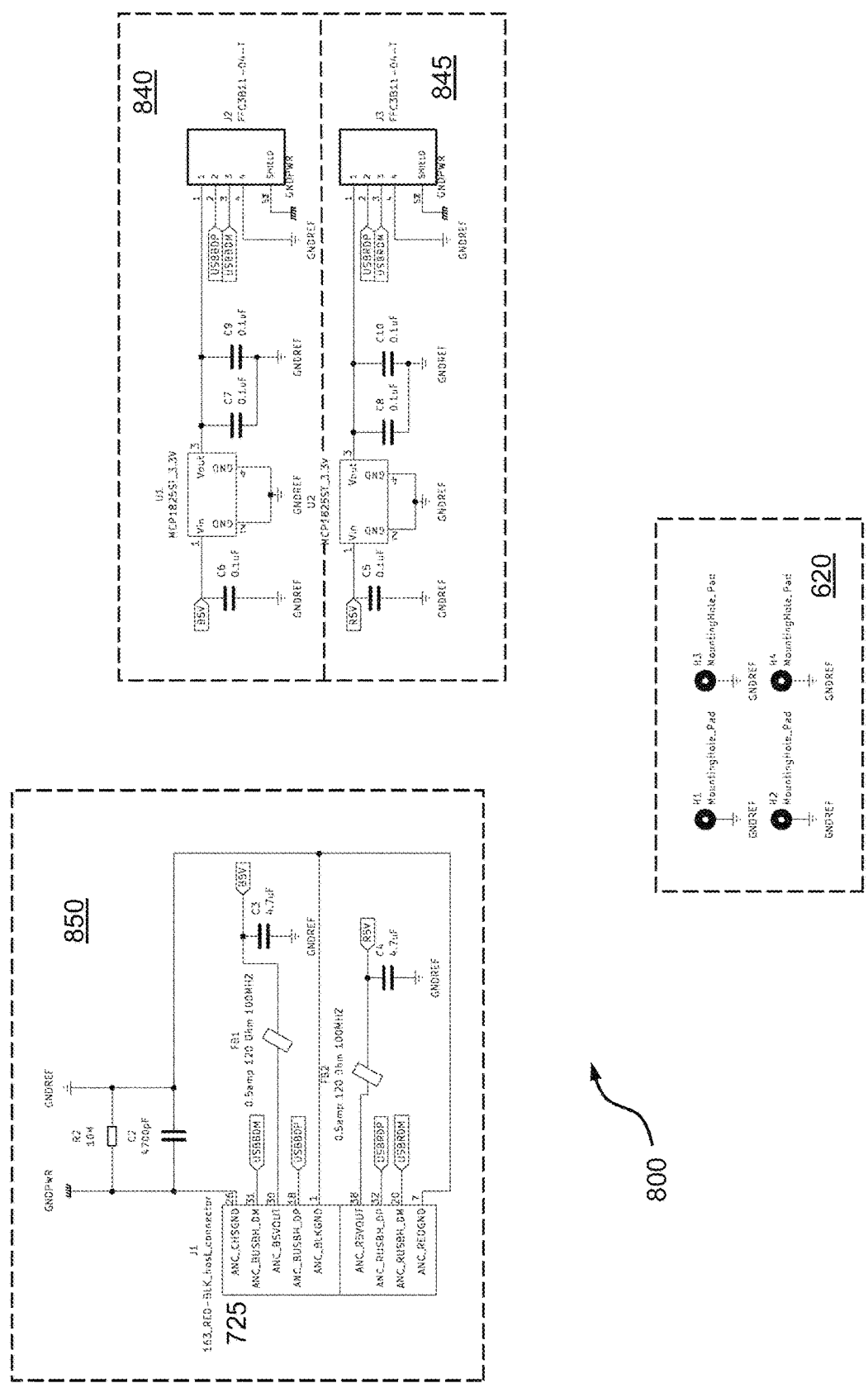

FIGS. 8A and 8B show schematic views 800 of respective circuit diagrams for the Red/Black PCB 540 and connector PCB 550 on the Ethernet dongle 510. The diagrams are subdivided into sections. These include a main section 810 for the red-black PCB 540, the pad section 620 for both red-black and connector PCBs 540 and 550, a connector section 820 with junction J1, an EE memory section 830 with processor U2, voltage regulator sections 840 and 845 for the connector PCB 550, a host section 850 with custom connector 725 for the connector PCB 550, a ground section 855, a transmit/receive section 860, first, second and third drain voltage sections 870, 880 and 885 and capacitor bank section 890.

The main section 810 includes oscillator crystal 435 and USB ports 611, MD/GP connectors 612, EE connectors 613, light emitting diodes 614, transmit/receive 615 and drain power voltage ($V_{DD}$) 616. The pad section 620 includes mounting holes. An electronically erasable programmable read only memory (EEPROM) section 630 includes EE connectors 613. The main, connector, memory, ground, transmit/receive, drain voltage and capacitor bank sections 810, 820, 830, 855, 860, 870, 880, 885 and 890 operate together in the red-black PCB 540 to receive Ethernet communication signals for transmission to the radio. The voltage regulator and host sections 840, 845 and 850 operate together in the connector PCB 550 to interface between the red PCB 530 and the red-black PCB 540 for conversion of red secret signals to black encrypted signals.

Figure 9A:
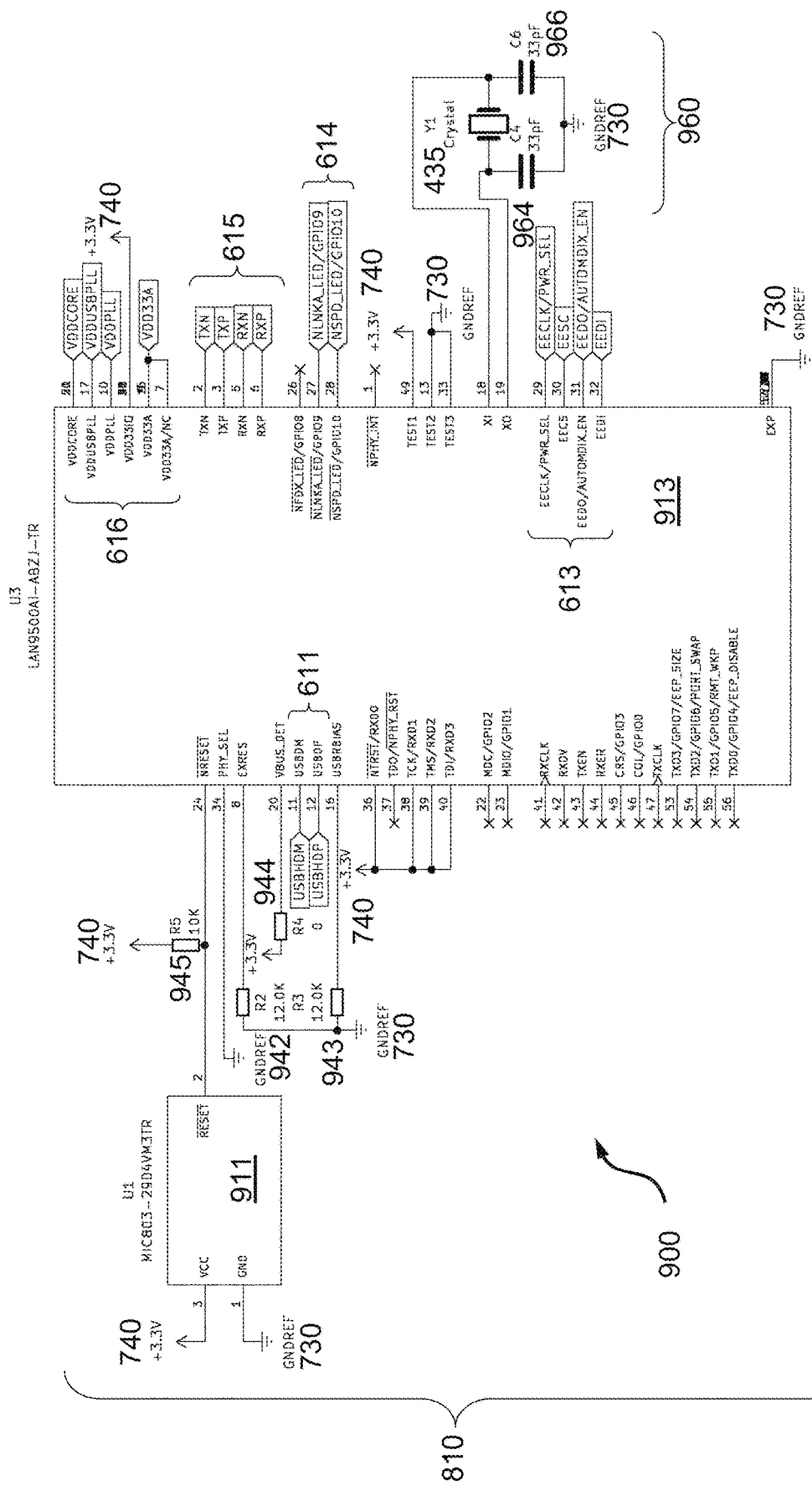
Figure 9D:
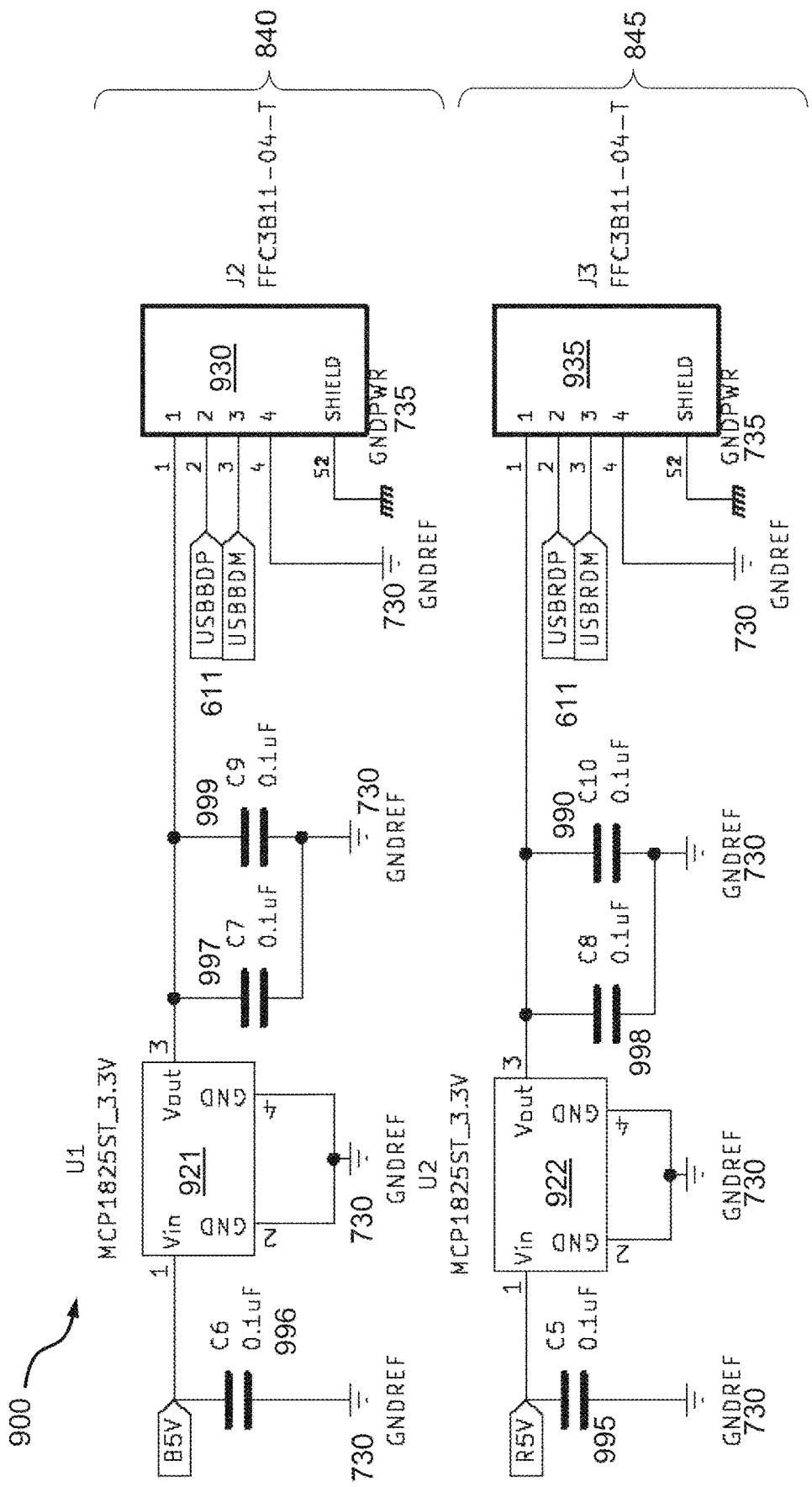
Figure 9E:
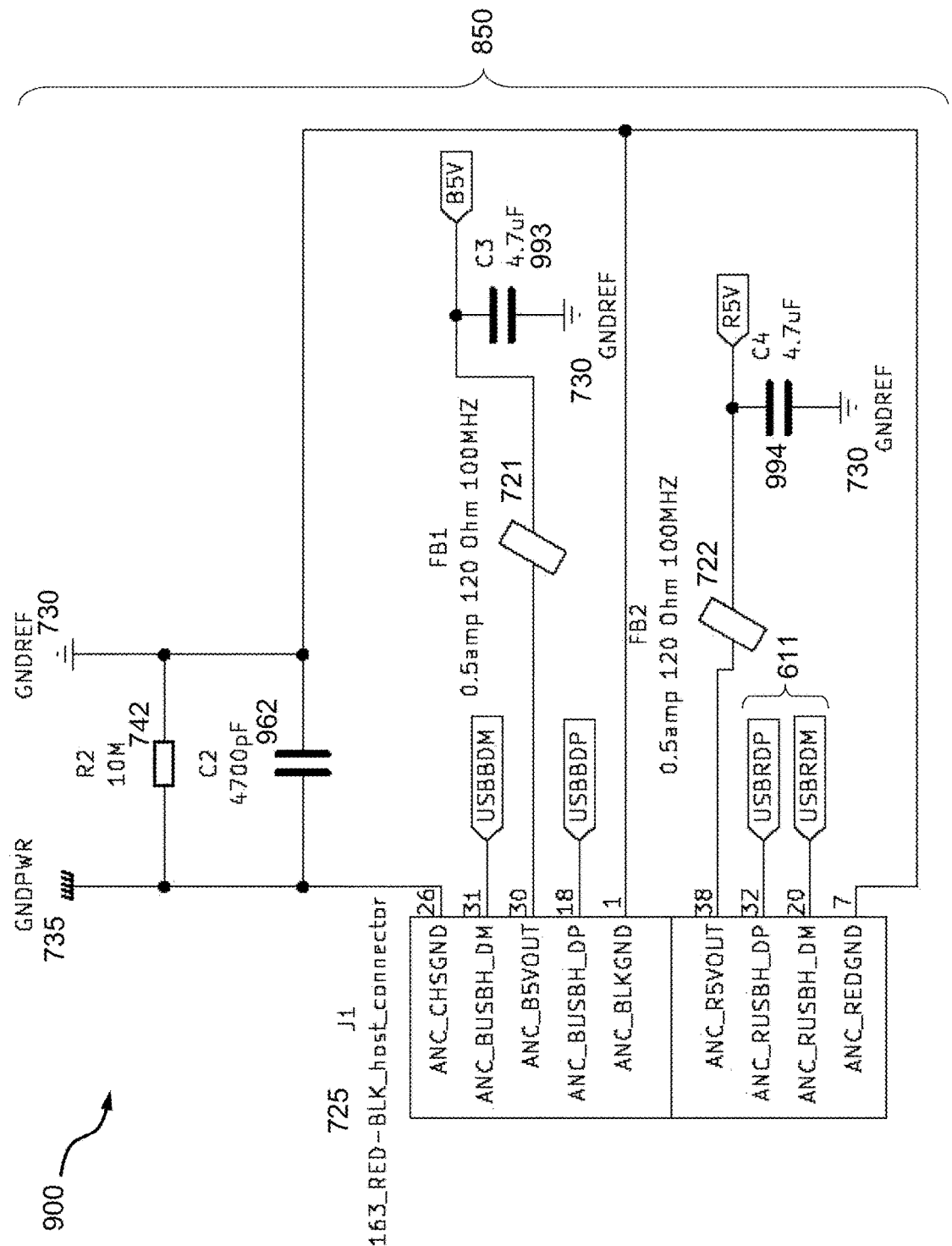

FIGS. 9A, 9B, 9C, 9D, 9E, 9F, 9G, 9H, 9I, 9J and 9K show detail schematic or tabular views 900 of components in the Red-Black Ethernet and Connector circuit diagrams for the dongle 510. FIG. 9A illustrates components in main section 810. FIG. 9B illustrates connector section 820. FIG. 9C illustrates components in EEPROM section 830. FIG. 9D illustrates circuit components in voltage regulator 840. FIG. 9E illustrates circuit components in host connector 850.

Figure 9H:
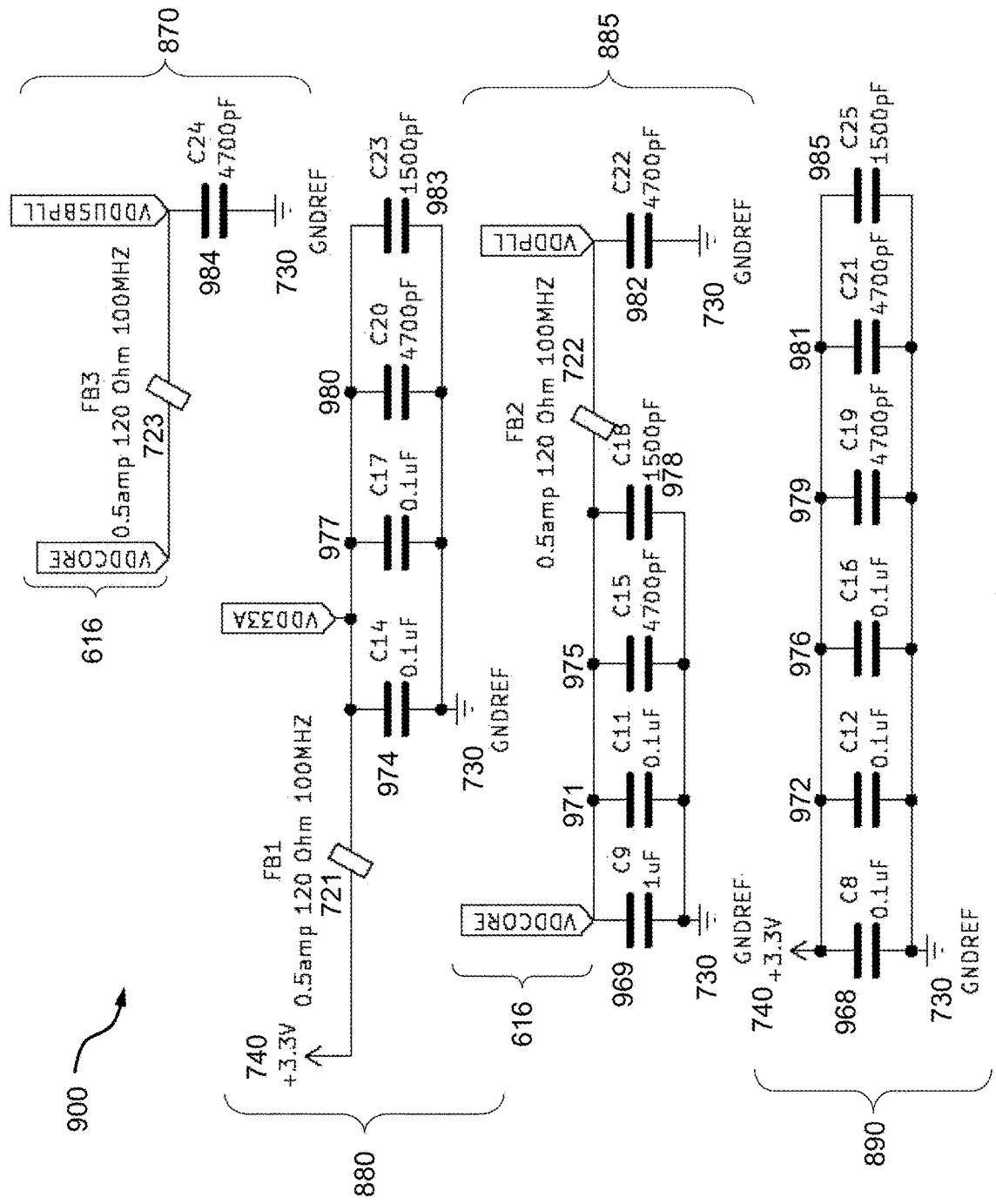

FIG. 9F illustrates connections in transmit/receive section 860. FIG. 9G illustrates components in ground section 855. FIG. 9H illustrates components in drain voltage sections 870, 880 and 885 as well as capacitor bank section 890. FIG. 9I provides a first tabular list of the labeled components with cross-references to select drawings. FIG. 9J provides a second tabular list of the labeled components for the red-black PCB 540 with manufacturing information. FIG. 9K provides a second tabular list of the labeled components for the connector PCB 550 with manufacturing information.

View 900 includes the following components distributed within the detail schematics listed in FIGS. 9I, 9J and 9K. The red-black PCB 540 includes flat flexible connector junction FFC3B11 as J1 910, semiconductors MIC803-2904VM3TR three-pin microprocessor supervisor circuit 911 as chip U1 in main section 810, EEPROM (memory) 93AA56AT-I/OT 912 as memory U2 in EE memory section 830 and LAN9500AI-A8ZJ-TR Ethernet controller 913 as chip U3 in main section 810 (analogous to controller 711 as chip U1 for integrated circuit 560), together with an RJMC2018 integrated circuit 920 as junction J2 in the transmit/receive section 860.

The connector PCB 550 includes a pair of 500 mA current regulator MCP18255T circuits 714 (from Pulse Electronics) as chip U1 921 and chip U2 922 in respective voltage regulators 840 and 845. The host section 850 includes junction J1 725 as a 163_Red_Blk host connector with two ferrous bead (FB) components 721 and 722 at current 0.5 A, resistance 120Ω and frequency 100 MHz as respective FB1 and FB2. FFC3B11-04-T connectors 930 and 935 are incorporated in voltage regulators 840 and 845 as respective junctions J2 and J3.

The red-black PCB 540 contains green/yellow light emitting diode (LED) 940 within junction J2 920 of the transmit/receive section 860. Another three FB components 721, 722 and 723 are distributed among drain voltage sections 880, 885 and 870 (in addition to the host section 850). Resistors include R1 941, R2 942, R3 943, R4 944, R5 945 in main section 810, as well as R6 946, R7 947, R8 948, R9 949, R10 950, R11 951 and R12 952, most of which apply to transmit/receive section 860. These resistors range from 0Ω to 10MΩ, as shown in FIG. 9I table.

An oscillator circuit 960 includes the Y1 crystal 435 in the main section 810. Capacitors on the red-black PCB 540 include C1 961, C2 962, C3 963, C4 964, C5 965, C6 966, C7 967, C8 968, C9 969, C10 970, C11 971, C12 972, C12 972, C13 973, C14 974, C15 975, C16 976, C17 977, C18 978, C19 979, C20 980, C21 981, C22 982, C23 983, C24 984 and C25 985, most of which apply to transmit/receive section 860, drain voltage sections 870, 880 and 885, and capacitor bank 890. Capacitors on the connector PCB 550 include C10 990, C3 993, C4 994, C5 995, C6 996, C7 997, C8 998 and C9 999, most of which apply to the transmit/receive section 860, voltage regulator sections 840 and 845, and the capacitor bank 890. These capacitors range from 15 pF to 4.7 µF, as shown in the FIG. 9I table.

FIG. 9J includes a tabular list 900 identifying manufacturers for components of the red PCB 530. These include four microchips: U1 as a USB-to-Ethernet interface 911 that denoted an LAN9500AI-ABZI-TR from SMSC; U2 as three-pin microprocessor supervisor circuit 912 denoted as MIC803-29D4VM3TR from either Microchip Technology or Micrel; U3 as EEPROM 913 denoted as 93AA56AT-I/OT memory circuit from Microchip Technology; and U4 as low voltage current regulator 914 denoted as MCP182SST-3302E/DB from Microchip Technology. The numerical labels match comparative quantitative characteristic parameters in farads or ohms. One should note that identifying names the capacitors and resistors for the red-black PCB 540 differ from those corresponding to the red PCB 530, while connector PCB 550 shares a few names of both. The numerical labels match comparative quantitative characteristic parameters in farads or ohms.

FIG. 9J shows a tabular view 900 of components for the red-black PCB 540. Microchips U1, U2 and U3 respectively denote MIC803-29D4VM3TR as three-pin circuit 911 (similar to circuit 712), EEPROM 912 as 93AA56AT-I/OT (similar to memory 713), and LAN9500AI-ABZI-TR as Ethernet controller 913 (similar to controller 711). Connectors J1 and J2 respectively denote a surface mount four-position FFC3B11-04-T assembly 910 (similar to assembly 580) and RJMG2018344A1ER 920 (also featured as 570), similar to the J0011D018 RJ45 receptor 720.

FIG. 9K shows a tabular view 900 of components for the connector PCB 550. Microchips U1 and U2 denote respective MCP182SST low dropout voltage regulators 911 and 912, similar to U4 as regulator 714 on the red Ethernet PCB 530. Custom junction J1 as 163_Red-BLK connector 725 is also similar to its counterpart on the red PCB 530. Also, flat flexible connector J2 and J3 denote FFC3B11-04-T assemblies 930 and 935 (analogous to assembly 580).

Additional components include ground reference 730, ground power 735, input voltage 736 as Vin at +5V, power flag 737 and chip voltage 740 as $V_{cc}$ at +3.3V.

Figure 10A:
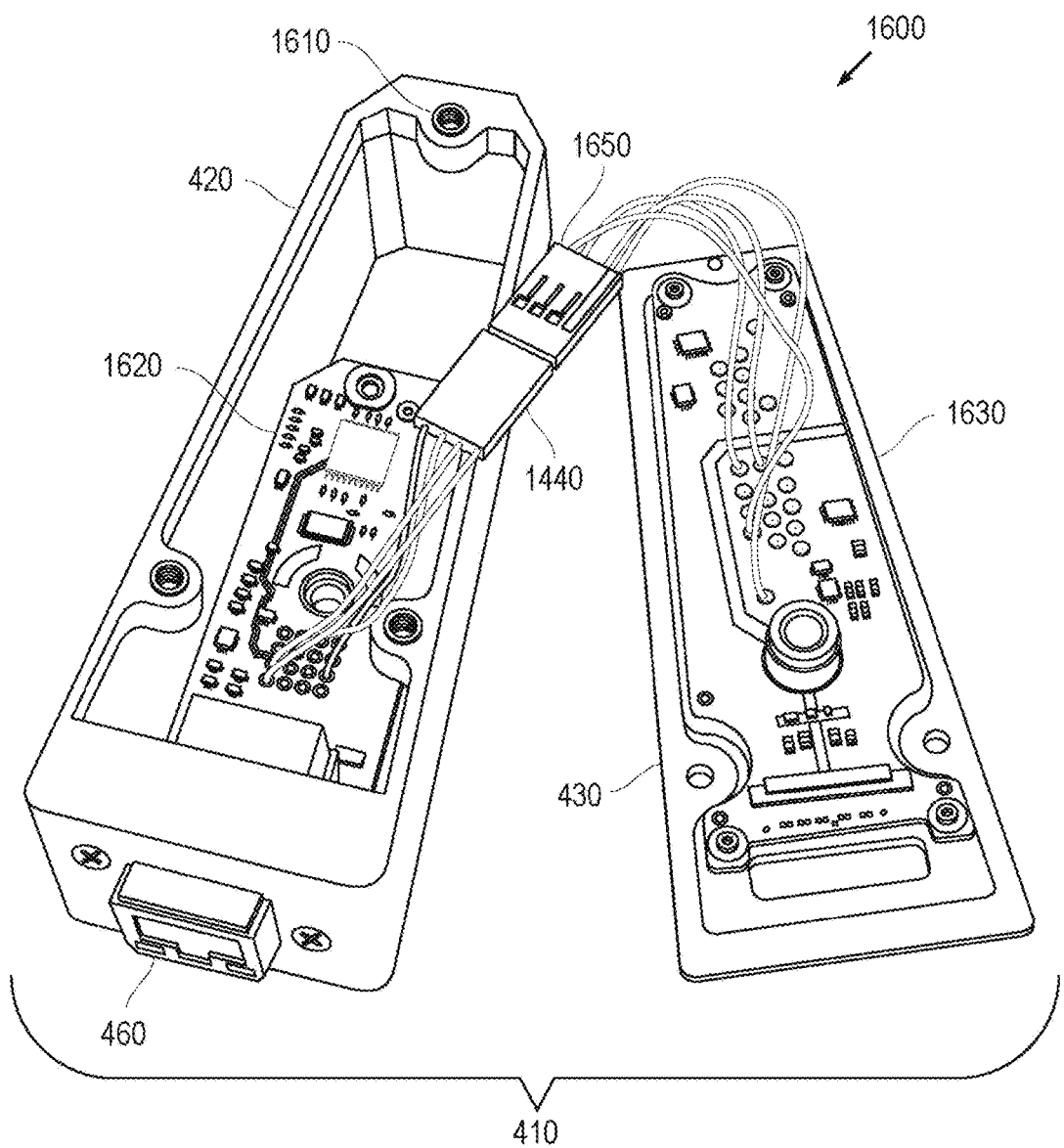
FIG. 10A is a perspective disassembly view of the red Ethernet dongle.
Figure 10B:
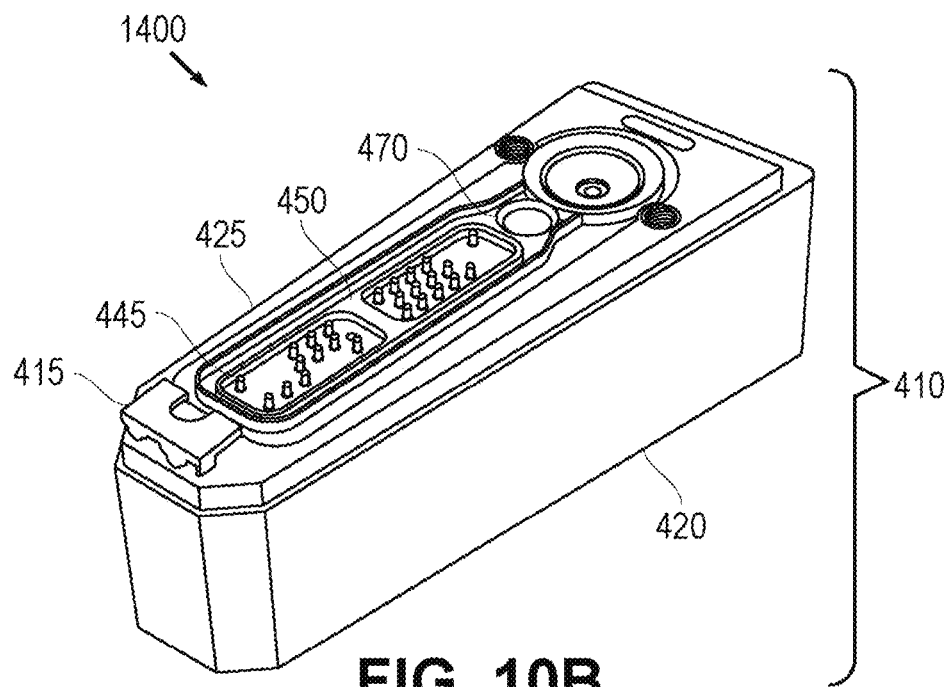
FIGS. 10B and 10C are perspective assembly views of the red Ethernet dongle.
Figure 10C:
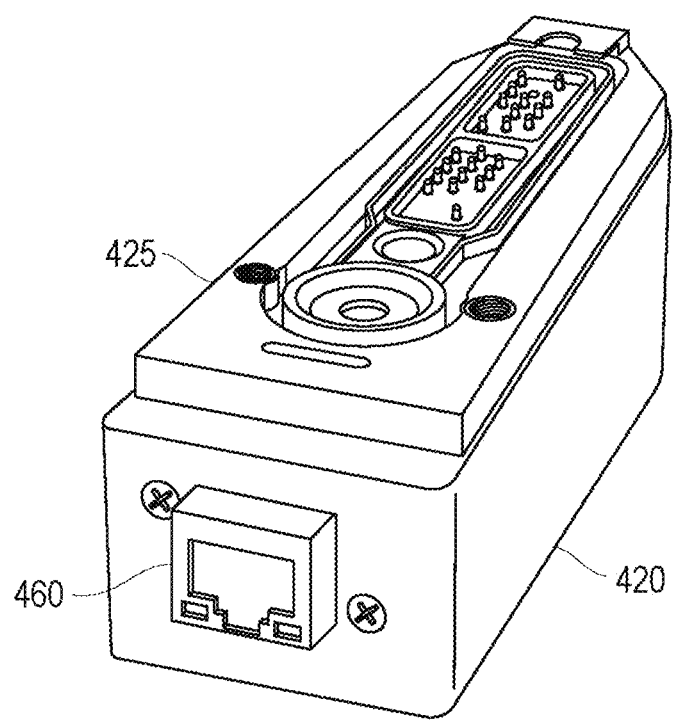

FIG. 10A shows a perspective exploded view 1000 of the Ethernet dongle 410 as hardware with the case box 420 and case lid 430 separated from their attach screws 1010. The box 420 and lid 425 include mounted circuit boards 1020 and 1030, respectively. These boards connect to each other by corresponding busses 1040 and 1050. FIGS. 10B and 10C show perspective assembly views 1000 of the Ethernet dongle 410 as hardware, featuring components in views 400.

Figure 11A:
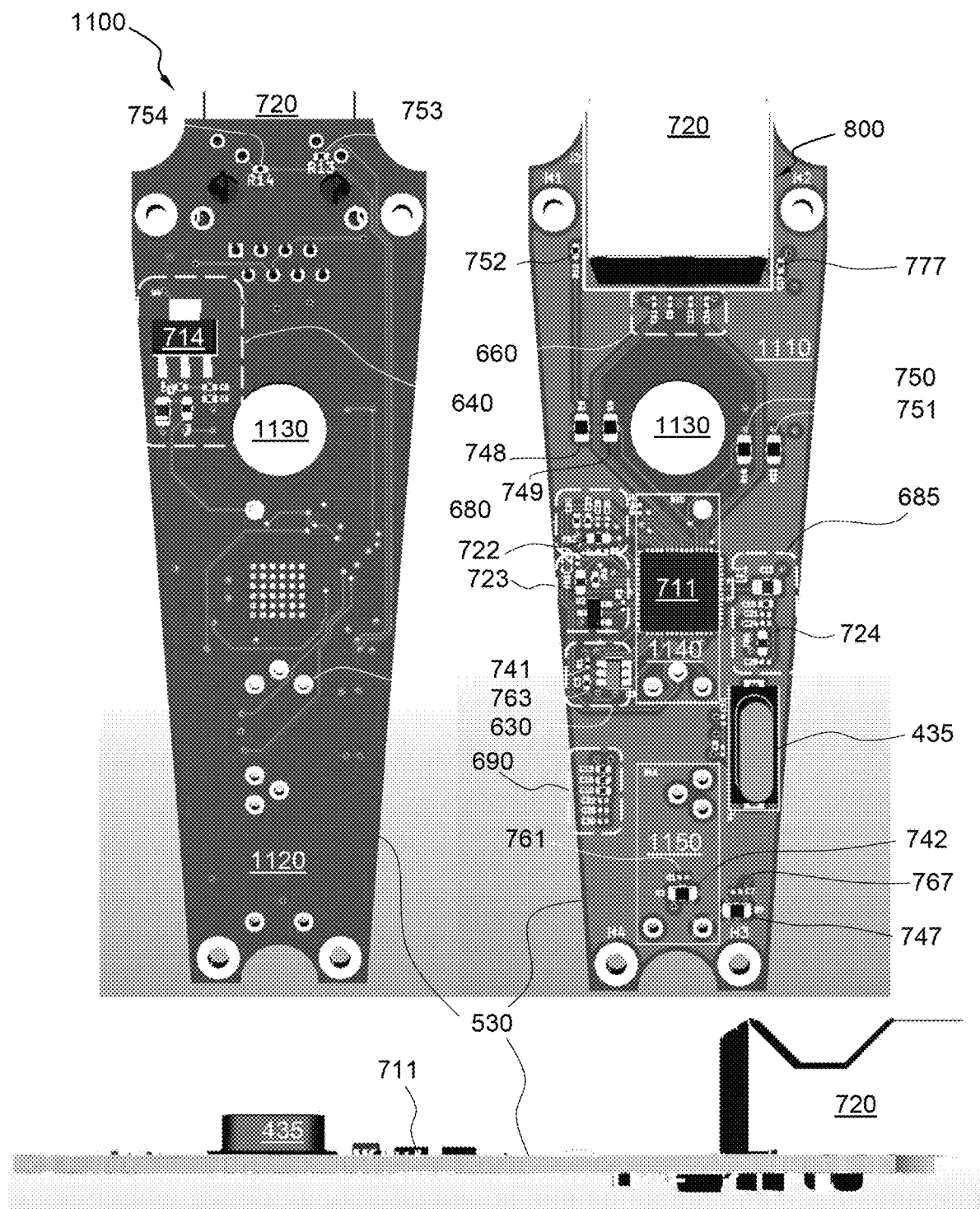
FIG. 11A is a set of plan and elevation views of a Red Ethernet PCB.
Figure 11B:
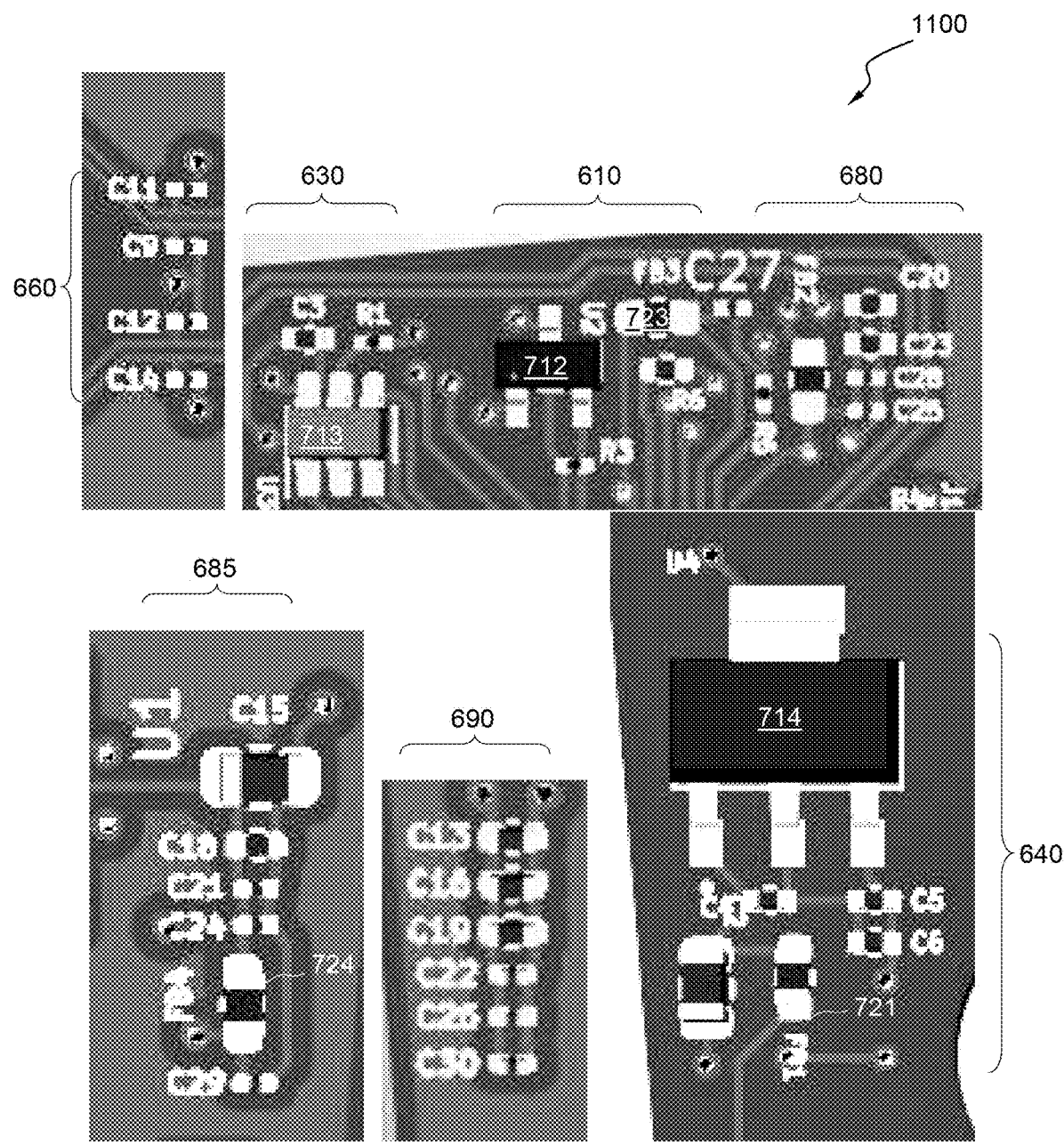
FIG. 11B is a set of detail plan views of PCB components.

FIG. 11A shows plan and elevation views 1100 of the red Ethernet PCB 530. FIG. 11B features detail plan views 1100 of the components. An obverse side 1110 and a reverse side 1120 feature several resistors and capacitors identified thereon. Components include a circular plate 1130, red and black junctions 1140 and 1150, and through-hole vias 1160. Red junction 1140 includes semiconductor U1 711. In FIG. 11B, sets of components correspond to sections from view 600. In particular, respective capacitor banks are identified in relation to sections 610, 660, 680, 685 and 690 in views 700.

Figure 12:
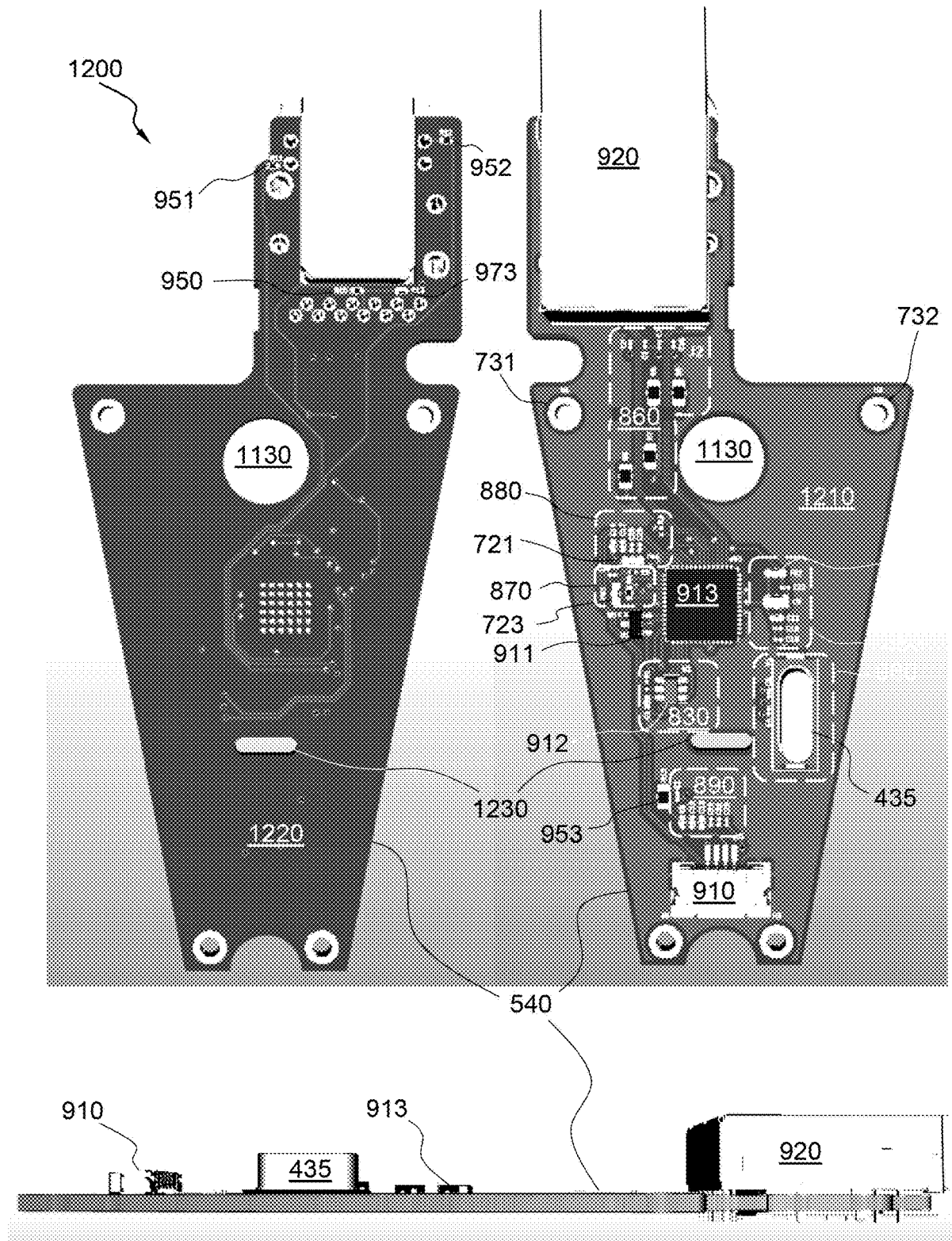
FIG. 12 is a set of plan and elevation views of a Red-Black Ethernet PCB.

FIG. 12 shows plan and elevation views 1200 of the red-black Ethernet PCB 540 with obverse and reverse sides 1210 and 1220, along with circular plate 1130 and elongated plate 1230. Components include many of those corresponding to red PCB 530, but with alternate correlations aligned to their associated design parameters. For example MIC803-29D4VM3TR 911 corresponds to U1, 93AA56AT-I/OT 912 corresponds to U2 and LAN9500AI 913 corresponds to U3. These integrated circuits are respectively similar to 712, 713 and 711 in red Ethernet PCB 530. In addition, connectors FFC3B11 580 and RJMG2018344A 570 respectively corresponds to J1 and J2.

Figure 13:
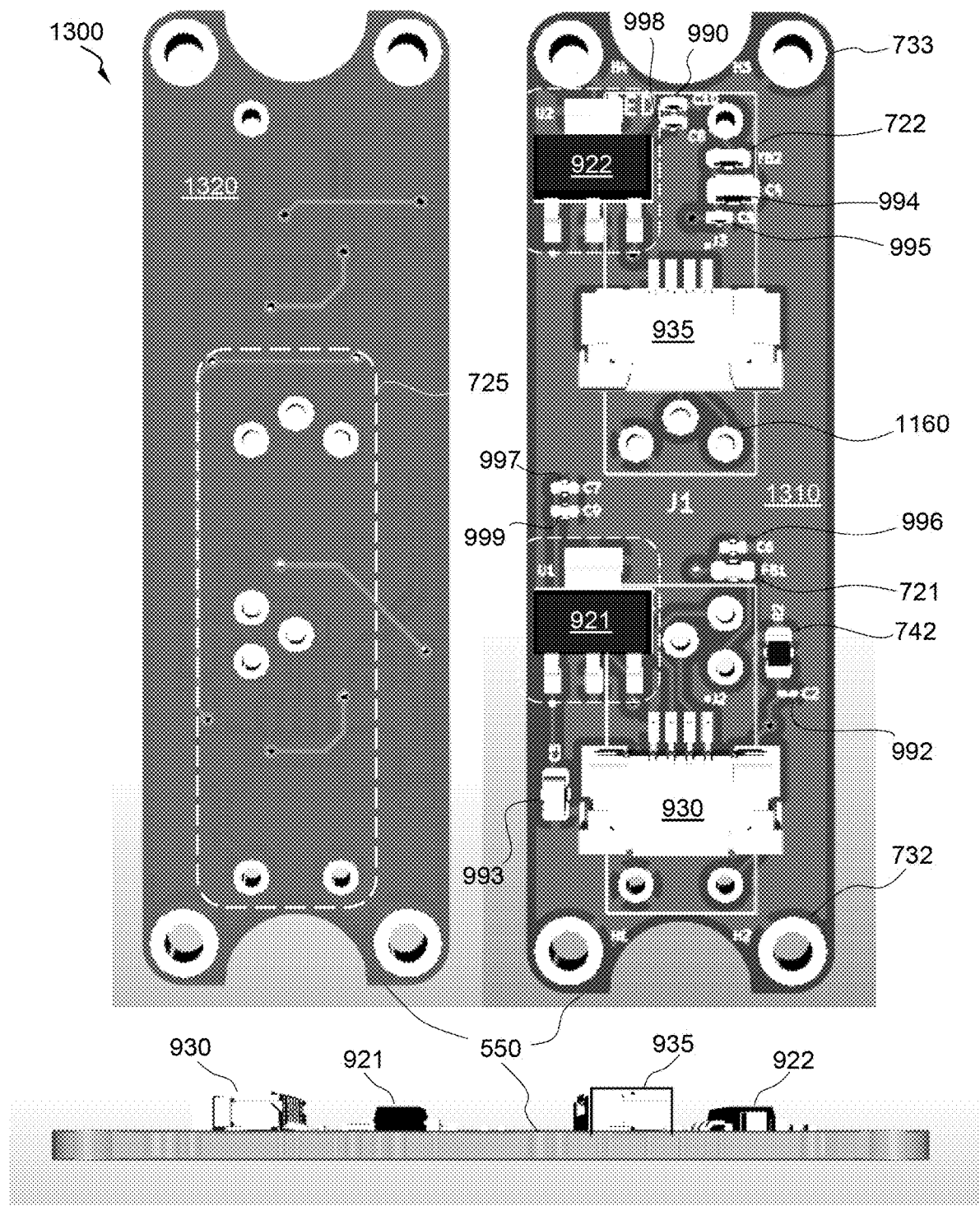
FIG. 13 is a set of plan and elevation views of a Red-Black Ethernet PCB.

FIG. 13 shows plan and elevation views 1300 of the connector PCB 550 with obverse and reverse sides 1310 and 1320. Components include MCP1825ST 921 and 922 as semiconductors U1 and U2, comparable to 714 as U4 in PCB 530, and FFC3B11 580 as junctions J2 930 and J3 935. Capacitors include C2 962, C3 993, C4 994 at 4.7 µF, and C5 995, C6 996, C7 997, C8 998, C9 999 and C10 990 at 0.1 µF. Resistor comprises R2 742 at 10 MΩ.

Figure 14:
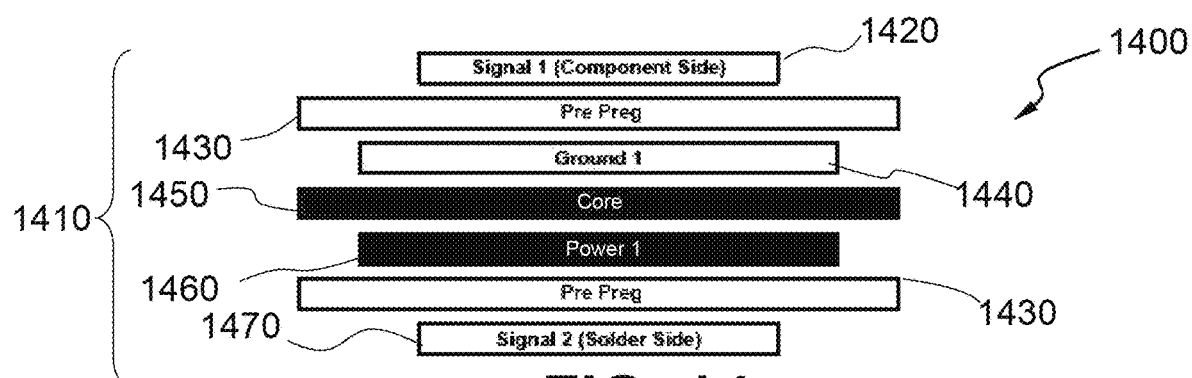
FIG. 14 is a set of plan and elevation views of a connector PCB.

FIG. 14 shows an elevation cross-section view 1400 of layers 1410 that form PCBs 530, 540 and 550. These include signal-1 1420 on the component side, pre-preg 1430, ground 1440, core 1450, power 1460, pre-preg 1430 and signal-2 1470 on the solder side. Components can connect to solder through the core 1450.

The exemplary ANPRC-163 RED Ethernet dongles 410 and 510 fit in the space of the enclosure 210, and outputs to a RJ-45 connector 460 for network plug purposes. To connect between the ANPRC-163 radio 110 and the network, one needs a USB-to-Ethernet adapter to convert the radio's signal data from USB to Ethernet, enabling the network IP access to the radio 110. The conventional L3Harris USB-to-Ethernet side dongle (view 300) is a large two-part solution including a 6' cable 330 between the two components 310 and 320. This configuration consumes too much space in the communications enclosure 210.

The ANPRC-163 red Ethernet side dongle 410 is built using the following techniques. The internal PCB schematic design (view 600) was completed by Joseph Horsey in KiCAD 6.0. Sunstone Circuits in Mulino, OR was sent the Gerber files to complete the manufacturing of the PCB 1030. The components purchased and populated on the board by screaming circuits in Canby, Oregon. A five-pin connector comprising the spacer 530 with pins 480 between the dongle 410 and the ANPRC-163 radio 110 is printed in-house using an SLA printer. This connector was designed by Joseph Horsey and comprises three different components.

The mill-max spring-loaded pins 480 (part number 0914-0-15-20-77-14-11-0) numbering five in total are pressed into a computer-aided design (CAAD) designed SLA printed holder or spacer 530 and a CAD-designed SLA printed case box 420 or lid 430 is disposed over the back side of the spacer 530. This box 420 or lid 430 not only encapsulates the pins 480, but also mounts to box 420 in the side dongle 410.

The interface between the five-pin connector and the PCB 540 comprises mill-max hex press-fit receptacles (part number 0531-0-15-15-31-27-10-0). The tail on the back side of the spring-loaded pin 480 fits into the finger contacts inside of the press-fit receptacles completing the circuit between the side of the ANPRC-163 radio 110 and the exemplary USB to Ethernet PCB. The combined Red-Black dongle 510 also provides signal conversion from encrypted to plaintext and vice versa. The red Ethernet PCB 530 replacing the red Ethernet PCB 540 combines with the red-black Ethernet PCB 540 and connector PCB 550, operating within box 510 and lid 520.

The purpose of these dongles are to input ground, USB host data negative and positive (USBHDM, USBHDP), and $5V_{DC}$ from an ANPRC-163 radio 110 and convert this signal from USB to 10/100 Ethernet. This conversion enables the operator to connect to the ANPRC-163 radio 110 to a 10/100 Ethernet network. The ANPRC-163 radio 110 connects to a CISCO network switch to pass data to a connected server and share cursor-on-target (COT) information from other ANPRC-163 radio 110 in the RF (radio frequency) network. This enables operators to connect to the network with personal computers to view the location of ANPRC-163's in the network on tactical assault kit (TAK). The $5V_{DC}$ from the ANPRC-163 radio 110 is converted to $3.3V_{DC}$ as $V_{cc}$ 740 to power the LAN9500AI chips 711 and/or 913 with their associated components.

The exemplary USB-to-Ethernet and dual-USB-to-Ethernet PCBs in the dongles 410 and 510 accomplish the same task of conventional USB-to-Ethernet conversion but accomplishes these abilities on the side of the radio 110 and within the enclosure 210. The dongles 410 and 510 also maintain connectivity without involving the cable 330, which is subject to severance, and instead employ connector cables that terminate at RJ45 plugs.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. An attachment device for Ethernet connection to a radio, said device comprising:
    a transmit/receive circuit for receiving a communication signal via an RJ45 receptor from Ethernet;
    an interface for universal serial bus (USB) to Ethernet that connects to said RJ45 receptor to forward said communication signal to said USB;
    a host connector for receiving said communication signal from said USB and forwarding to the radio;
    an oscillator to provide a periodic clock signal;
    a three-pin microprocessor supervisor circuit for sequencing said communication signal via said clock signal and a sequence protocol;
    a programmable read-only-memory (PROM) for buffering said communication signal and said sequence protocol;
    a current regulator for restricting voltage range of said supervisor circuit;
    a printed circuit board (PCB) onto which mount said transmit/receive circuit, interface, host connector, oscillator, supervisor circuit, PROM and current regulator; and
    a housing to contain said PCB.

2. The device according to claim 1, wherein said PCB denotes a plurality of PCBs.

3. The device according to claim 1, wherein said PROM is electronically erasable.

4. The device according to claim 1, wherein said interface is encrypted.

5. The device according to claim 1, wherein said PCB further includes:
    a flat flexible connector.

6. The device according to claim 1, wherein said PCB further includes:
    a low dropout voltage regulator.

7. The device according to claim 6, wherein said voltage regulator includes a capacitor bank.

8. The device according to claim 1, wherein said oscillator includes a quartz crystal.

\* \* \* \* \*